United States Patent
Kwak et al.

(10) Patent No.: US 12,470,280 B2
(45) Date of Patent: Nov. 11, 2025

(54) BEAM INDICATION BASED ON TCI STATE GROUP

(71) Applicant: InterDigital Patent Holdings, Inc., Wilmington, DE (US)

(72) Inventors: Young Woo Kwak, Woodbury, NY (US); Moon-il Lee, Melville, NY (US); Paul Marinier, Brossard (CA); Virgil Comsa, Montreal (CA); Afshin Haghighat, Ile-Bizard (CA); Prasanna Herath, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/019,593

(22) PCT Filed: Jul. 30, 2021

(86) PCT No.: PCT/US2021/043982
§ 371 (c)(1),
(2) Date: Feb. 3, 2023

(87) PCT Pub. No.: WO2022/031546
PCT Pub. Date: Feb. 10, 2022

(65) Prior Publication Data
US 2023/0216565 A1 Jul. 6, 2023

Related U.S. Application Data

(60) Provisional application No. 63/185,490, filed on May 7, 2021, provisional application No. 63/091,691, filed
(Continued)

(51) Int. Cl.
*H04B 7/06* (2006.01)
*H04B 7/08* (2006.01)
*H04W 72/23* (2023.01)

(52) U.S. Cl.
CPC ......... *H04B 7/0623* (2013.01); *H04B 7/0632* (2013.01); *H04B 7/0695* (2013.01); *H04B 7/088* (2013.01); *H04W 72/23* (2023.01)

(58) Field of Classification Search
CPC .. H04B 7/0623; H04B 7/0632; H04B 7/0695; H04B 7/088; H04W 72/23; Y02D 30/70
(Continued)

(56) References Cited

U.S. PATENT DOCUMENTS 11,503,626 B2 * 11/2022 Liou ...................... H04L 5/0053
11,950,306 B2 * 4/2024 Park ................... H04B 7/06968
(Continued)

FOREIGN PATENT DOCUMENTS

WO 2019/193581 A2 10/2019
WO 2020146377 A1 7/2020

OTHER PUBLICATIONS

3rd Generation Partnership Project, TS 38.101-2 V16.2.0, "User Equipment (UE) radio transmission and reception; Part 2: Range 2 Standalone Release 16" Dec. 2019, pp. 1-157.
(Continued)

*Primary Examiner* — Emmanuel Bayard
(74) *Attorney, Agent, or Firm* — Condo Roccia Koptiw LLP

(57) ABSTRACT

A wireless transmit/receive unit (WTRU) may be configured to receive configuration information associated with a first transmission configuration indicator (TCI) state group and a second TCI state group. The WTRU may be configured to report first respective measured downlink received power values and first respective determined power reduction values. The WTRU may be configured to report second respective measured downlink received power values and second respective determined power reduction values. The WTRU may be configured to receive an indication of the first TCI
(Continued)

| TCI state group indication (e.g., via DCI or MAC CE) | TCI state #1 in a TCI state group | TCI state #2 in a TCI state group |
|---|---|---|
| 0 | 0 | 2 |
| 1 | 2 | 6 |
| 2 | 3 | 5 |
| 3 | 1 | 3 |
| 4 | 2 | 4 |
| 5 | 7 | 15 |
| 6 | 8 | 13 |
| 7 | 9 | 10 |

Determined TCI state group state group via a downlink transmission. The WTRU may be configured to determine a first TCI state from the first TCI state group based on downlink received power information and power reduction information. The WTRU may be configured to send an uplink transmission based on the first determined TCI state.

13 Claims, 14 Drawing Sheets

Related U.S. Application Data on Oct. 14, 2020, provisional application No. 63/061,644, filed on Aug. 5, 2020.

(58) Field of Classification Search
USPC .................................... 375/267, 299, 347
See application file for complete search history.

(56) References Cited

U.S. PATENT DOCUMENTS

| | | | |
|---|---|---|---|
| 2019/0306850 A1 | 10/2019 | Zhang et al. | |
| 2020/0229169 A1 | 7/2020 | John Wilson et al. | |
| 2021/0037562 A1* | 2/2021 | Takeda | H04L 12/189 |
| 2021/0119688 A1* | 4/2021 | Enescu | H04B 7/0404 |
| 2021/0368457 A1* | 11/2021 | Chen | H04W 72/1273 |
| 2022/0039072 A1* | 2/2022 | Babaei | H04W 72/23 |
| 2022/0272685 A1* | 8/2022 | Rahman | H04L 5/001 |
| 2023/0106244 A1* | 4/2023 | Yu | H04L 5/0035 370/329 |
| 2023/0144010 A1* | 5/2023 | Kwak | H04L 5/0053 370/329 |
| 2023/0292335 A1* | 9/2023 | Park | H04B 7/0404 |
| 2024/0275562 A1* | 8/2024 | Papasakellariou | H04W 72/23 |
| 2024/0276491 A1* | 8/2024 | Zhu | H04B 7/06952 |

OTHER PUBLICATIONS

3rd Generation Partnership Project, TS 38.101-1 V16.2.0, "Technical Specification Group Radio Access Network, NR, User Equipment (UE) radio transmission and reception, Part 1: Range 1 Standalone (Release 16)", Dec. 2019, pp. 1-310.

3rd Generation Partnership Project, TS 38.101-3 V16.2.1, "Technical Specification Group Radio Access Network, NR, User Equipment (UE) radio transmission and reception, Part 3: Range 1 and Range 2 Interworking operation with other radios (Release 16)", Dec. 2019, pp. 1-349.

3rd Generation Partnership Project, TS 38.213 V16.1.0, "Technical Specification Group Radio Access Network, NR, Physical layer procedures for control (Release 16)", Mar. 2020, pp. 1-156.

3rd Generation Partnership Project, TS 38.214 V16.1.0, "Technical Specification Group Radio Access Network, NR, Physical layer procedures for data (Release 16)", Mar. 2020, pp. 1-151.

3rd Generation Partnership Project, TS 38.321 V16.0.0, "Technical Specification Group Radio Access Network, NR, Medium Access Control (MAC) protocol specification (Release 16)", Mar. 2020, pp. 1-141.

3rd Generation Partnership Project, TS 38.331 V16.0.0, "Technical Specification Group Radio Access Network, NR, Radio Resource Control (RRC) protocol specification (Release 16)", Mar. 2020, pp. 1-835.

\* cited by examiner

| TCI state group indication (e.g., via DCI or MAC CE) | TCI state #1 in a TCI state group | TCI state #2 in a TCI state group |
|---|---|---|
| 0 | 0 | 2 |
| 1 | 2 | 6 |
| 2 | 3 | 5 |
| 3 | 1 | 3 |
| 4 | 2 | 4 |
| 5 | 7 | 15 |
| 6 | 8 | 13 |
| 7 | 9 | 10 |

Determined TCI state group

FIG. 4

BEAM INDICATION BASED ON TCI STATE GROUP

CROSS-REFERENCE TO RELATED APPLICATIONS

This application is the National Stage Entry under 35 U.S.C. § 371 of Patent Cooperation Treaty Application No. PCT/US2021/043982, filed Aug. 5, 2020, which claims the benefit of Provisional U.S. Patent Application No. 63/061,644, filed Aug. 5, 2020, Provisional U.S. Patent Application No. 63/091,691, filed Oct. 14, 2020, and Provisional U.S. Patent Application No. 63/185,490, filed May 7, 2021, the disclosure of which is incorporated herein by reference in its entirety.

BACKGROUND

Mobile communications using wireless communication continue to evolve. A fifth generation of mobile communication radio access technology (RAT) may be referred to as 5G new radio (NR). A previous (legacy) generation of mobile communication RAT may be, for example, fourth generation (4G) long term evolution (LTE).

SUMMARY

Systems, methods, and instrumentalities are described herein for beam indication based on a transmission configuration index (TCI) state group. A wireless transmit/receive unit (WTRU) may include a processor. The processor may be configured to receive configuration information associated with a first transmission configuration indicator (TCI) state group and a second TCI state group. For example, the first TCI state group may include first TCI states and the second TCI state group may include second TCI states. Each respective TCI state of the first TCI states and the second TCI states may be associated with a respective downlink reference signal.

The processor may be configured to report first values. For example, the first values may include first respective measured downlink received power values and first respective determined power reduction values. Each of the first respective measured downlink received power values and each of the first respective determined power reduction values may be associated with a respective downlink reference signal that is associated with a respective TCI state of the first TCI states. The processor may be configured to report second values. For example, the second values may include second respective measured downlink received power values and second respective determined power reduction values. Each of the second respective measured downlink received power values and each of the second respective determined power reduction values may be associated with a respective downlink reference signal that is associated with a respective TCI state of the second TCI states.

The processor may be configured to receive an indication of the first TCI state group via a downlink transmission. For example, the downlink transmission may include scheduling information for an uplink transmission. The processor may be configured to determine a first TCI state from the first TCI state group based on downlink received power information and power reduction information. The processor may be configured to send the uplink transmission based on the first determined TCI state.

BRIEF DESCRIPTION OF THE DRAWINGS

FIG. 4 illustrates an example of a TCI state group indication.

EXAMPLE NETWORKS FOR IMPLEMENTATION OF THE EMBODIMENTS

Figure 1A:
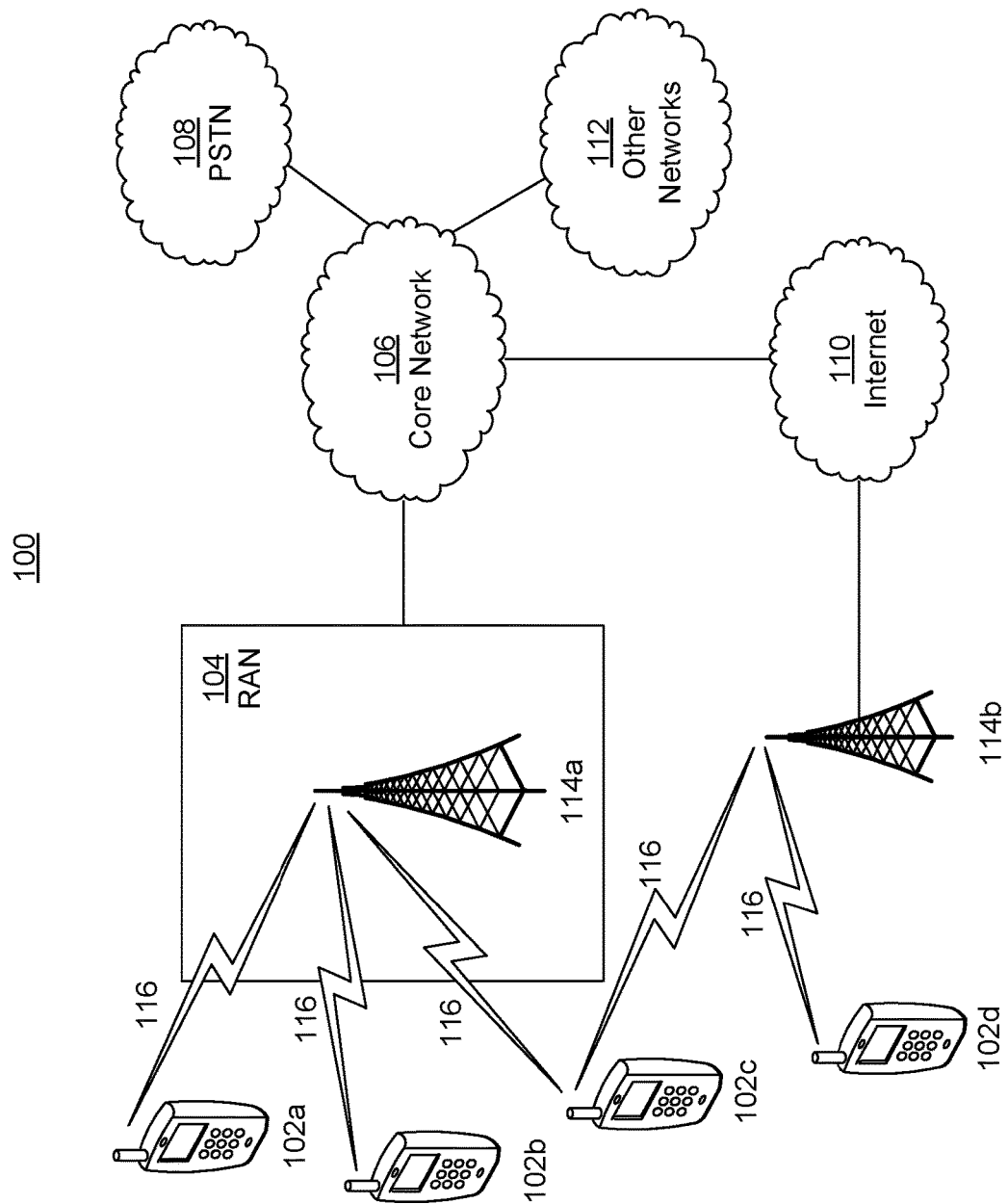
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
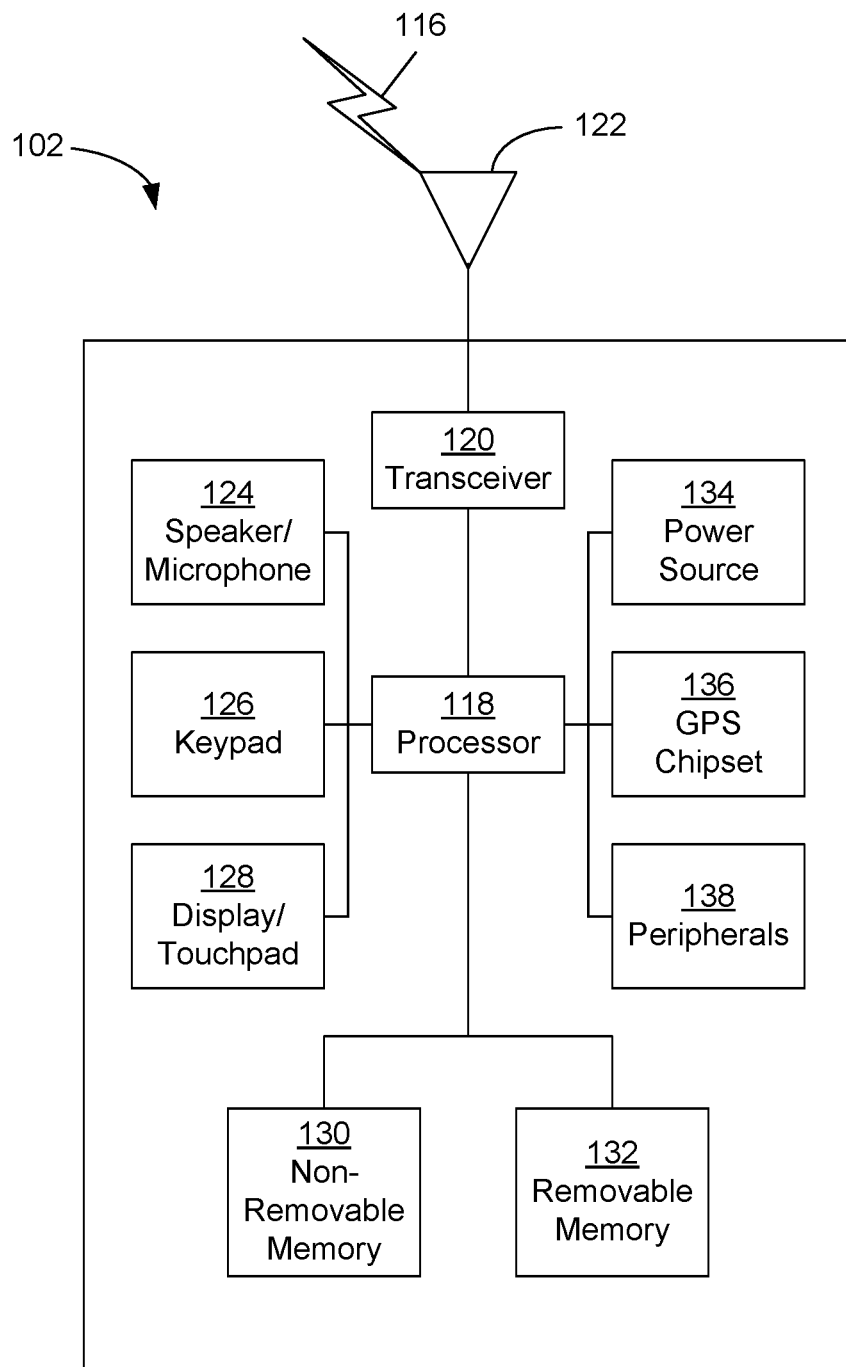
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
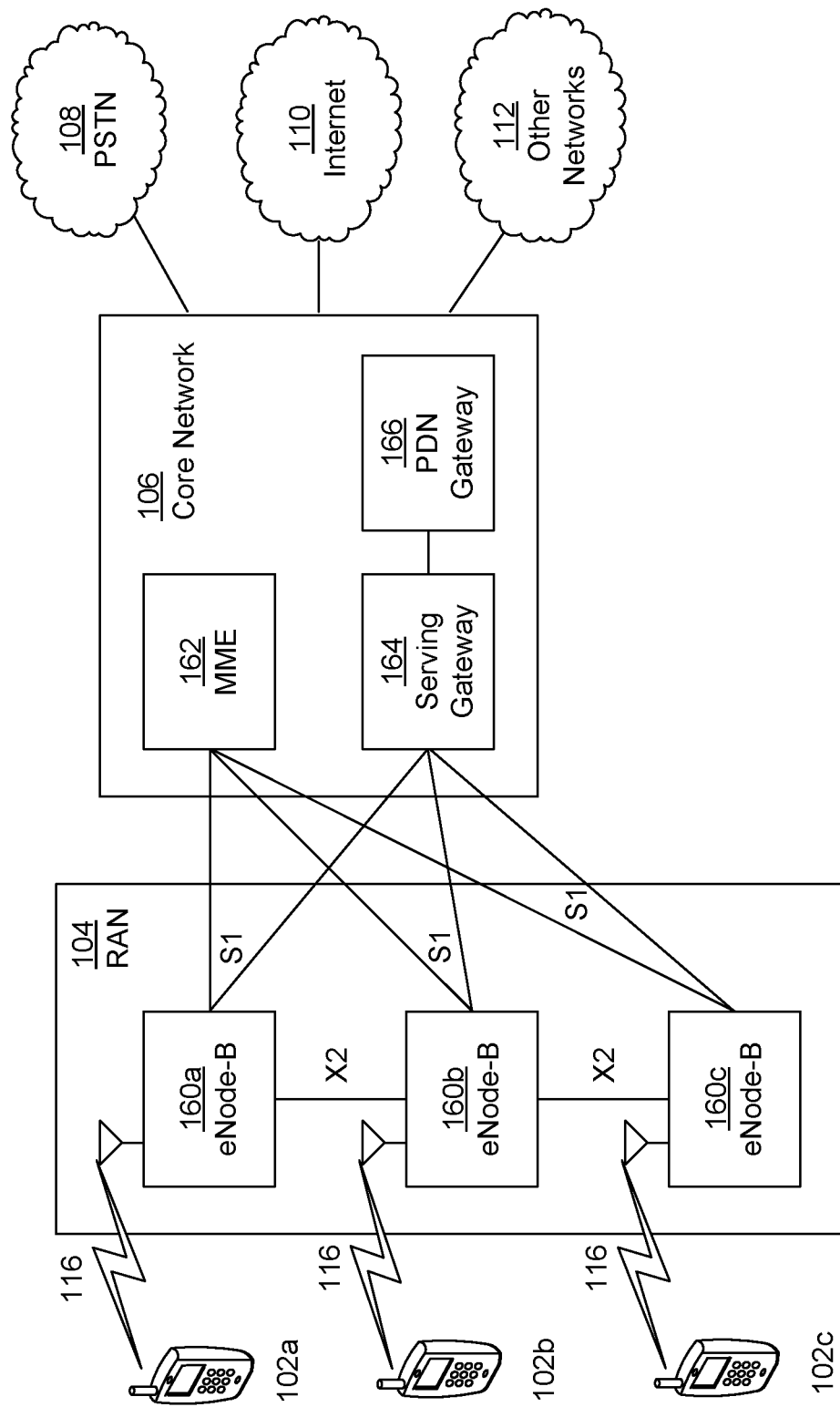
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
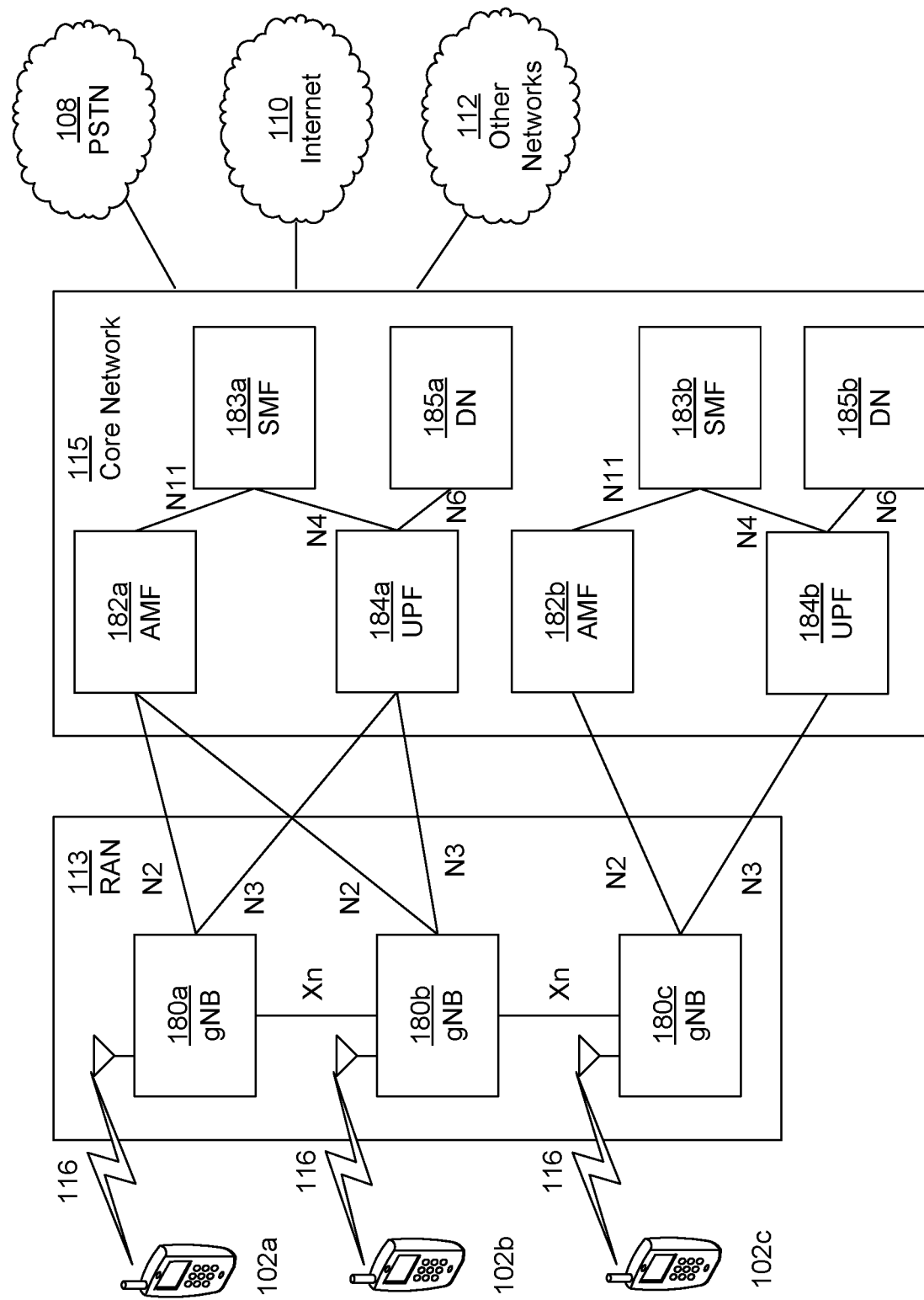
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*,184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems, methods, and instrumentalities are described herein for beam indication based on a transmission configuration index (TCI) state group. A TCI state group (e.g., and/or a wireless transmit/receive unit (WTRU) panel) may be used for at least one of: reception of a physical downlink control channel (PDCCH) and/or a physical downlink shared channel (PDSCH) and transmission of a physical uplink control channel (PUCCH) and/or a physical uplink shared channel (PUSCH). A WTRU may determine a beam determination (e.g., a spatial relation, quasi co-location (QCL) assumption, etc.), for example, based on a TCI state group, and may determine a TCI state from the TCI state group. A TCI state group may be determined, for example, based on one or more of the following: triggering of a TCI state group indication; a specific configuration of a PDCCH (e.g., a control resource set (CORESET), or a search space) applicable to a (e.g., each) TCI state group; and/or signaling (e.g., to determine an active TCI state group). Determining a TCI state group based on a specific configuration of a PDCCH utilize/monitor (e.g., only) active TCI state group(s). TCI state groups (e.g., all TCI state groups) may be active, for example, if a duration of time associated with TCI state group switch (e.g., a TCI state group switch timer) is running. A duration of time (e.g., a timer) may be started, for example, upon triggering or transmission of a TCI state group indication. A duration of time (e.g., a timer) may be stopped, for example, upon reception of PDCCH. An active TCI state group may be determined based on the received PDCCH. Determining a TCI state group based on signaling may include, for example, one or more of the following: an (e.g., explicit) indication from a gNB (e.g., downlink control information (DCI), medium access control (MAC) control element (CE), etc., or parameter(s) with a processing-time aspect); an (e.g., implicit) indication from a gNodeB (gNB); an (e.g., explicit) indication from a WTRU (e.g., uplink control information (UCI), MAC CE, etc.); and/or an (e.g., implicit) indication from a WTRU.

A beam indication may be determined from a TCI state group. TCI states may be determined from a determined TCI state group based on, for example, an (e.g., explicit) indication for a TCI state group (e.g., group identifier (ID) by radio resource control (RRC)/MAC CE); and/or an (e.g., implicit) indication for a TCI state group (e.g., same channel state information (CSI) reference signal (RS) resource set, sounding reference signal (SRS) resource set, and/or the like).

A TCI state group indication may be triggered, for example, based on one or more of the following: a TCI state group metric, reception of signaling by a network, and/or a WTRU implementation. A TCI state group metric may include a measurement (e.g., L3, CSI, transmission (Tx) power, power headroom report (PHR), maximum permissible exposure (MPE) and/or specific absorption rate (SAR), Pcmax per TCI state group, and/or the like). A TCI state group indication may be triggered by a TCI state group metric, for example, if a metric becomes lower than a threshold, which may change the "best" TCI state group metric.

TCI state group indications may include, for example, one or more of the following: a DCI/MAC CE indicating TCI state group from gNB; a MAC CE (e.g., an extended PHR report, which may include a TCI state group metric for a (each) TCI state group or the best); reception of PDCCH/DCI with certain properties; a last WTRU TCI state group indication before reception of a confirmation DCI; scheduling request (SR)-like signaling or physical random access channel (PRACH) (e.g., resource may depend on best TCI state); CSI reporting (e.g., based on absolute reference signal received power (RSRP)/signal-to-interference-plus-noise ratio (SINR)/channel quality index (CQI) value, differential RSRP/SINR/CQI value between multiple CSI-RS resource indicators (CRIs)); and/or the like. Reception of PDCCH/DCI with certain properties may include, for example, a dedicated CORESET group per TCI state group (e.g., including a time window after WTRU reporting); a dedicated CORESET for confirmation (e.g., including time window after WTRU reporting); radio network temporary identifier (RNTI) differentiation, DCI format, etc.; assigned resources; and/or the like.

A joint TCI state indication may be based on a DCI-based TCI state indication for multiple channels. A joint TCI state indication may be based on an RRC configuration and/or a WTRU capability. For example, the joint TCI state indication may be based on a configuration of a cell, CORESETs, and/or search spaces for the common beam operation. A joint TCI state indication may be based on a TCI state indication with PDSCH scheduling. For example, the joint TCI state indication may be based on ACK/NACK of PDSCH e.g., which may relieve reliability issues. If a TCI state equals a previously indicated TCI state, the TCI state may be used for a whole operation. If a TCI state does not equal a previously indicated TCI state, an offset may be applied and the TCI state with the offset may be applied for a whole operation.

An RS may be used to determine a joint TCI state indication. For example, a joint TCI state indication may be based on DL RSs for CORESET beams (e.g., instead of configured and/or indicated SRS(s)). If a joint beam indication indicates SRS, a WTRU may apply one or more of the following: a default beam (e.g., a DL RS) for the CORESETs or an associated DL RS.

A base station (e.g., a next generation NodeB (gNB)) may provide a confirmation of WTRU ACK/NACK of beam indication. A WTRU may make a determination of a mode of operation (e.g., beam application based on gNB confirmation or not) based on quality of channel and/or DCI format. The WTRU may determine a base station confirmation (e.g., a gNB confirmation) based on RS transmission(s). The WTRU may determine a base station confirmation (e.g., a gNB confirmation) based on PDCCH transmission(s). The WTRU may determine confirmation of ACK/NACK of beam indication based on one or more of the following: explicit indication; whether ACK is transmitted or not; based on one or more configurations (e.g., scrambling ID, RNTI, periodicity, aggregation level and etc) of transmitted ACK/NACK; or receiving a new or change in configuration of downlink or uplink resources. The WTRU may use different confirmation methods based on the WTRU-reported ACK/NACK.

A beam indication may be determined (e.g., for multiple input multiple output (MIMO), such as NR MIMO), for example, based on a transmission configuration index (TCI) state group. A beam management framework may support beam pairing between a WTRU and a base station (e.g., a gNB). Transmission mode(s) may be based on a single WTRU panel or a WTRU multi-panel. A beam management framework may be applicable to downlink and/or uplink transmission with single WTRU panel and/or WTRU multi-panel based transmission and/or reception. A beam management framework may provide a unified TCI framework, fast panel selection, and/or maximum permissible exposure (MPE) mitigation.

In examples associated with a unified TCI framework, a beam management framework may support a beam indication with different types of indication for downlink and uplink. For example, a base station (e.g., a gNB) may indicate a TCI state (e.g., including a downlink reference signal (RS) for downlink transmission) and the base station (e.g., the gNB) may indicate spatial relation information (e.g., including an uplink RS for uplink transmission). An RS may be used for a beam indication regardless of transmission direction (e.g., downlink or uplink), for example, if a gNB and a WTRU have beam related information (e.g., a spatial relation filter). Such RS use may be associated with efficiency of beam indication and/or a reduction in RS overhead.

In examples associated with fast panel selection, a beam management framework may support more efficient panel selection mechanisms (e.g., on top of a unified TCI framework).

In examples associated with MPE mitigation, MPE mitigation may be implemented by a WTRU. A WTRU may report power management—maximum power reduction (P-MPR), for example, on a medium access control (MAC) control element (CE). A base station (e.g., a gNB) may process WTRU P-MPR reporting, for example, with a single WTRU panel and/or multiple WTRU panels.

In examples, a WTRU may activate an optimized panel with less signaling overhead and power consumption. Physical downlink shared channel (PDSCH) reception may be based on determination of a TCI state in a TCI state group. For example, a WTRU may receive multiple TCI state groups and multiple TCI states, e.g., multiple TCI states for each of the multiple TCI state groups. The WTRU may measure RSs associated with the multiple TCI states. The WTRU may report WTRU measurement result(s) (e.g., a reference signal received power (RSRP) value and/or a P-MPR value) associated with the RSs. The WTRU may receive a base station confirmation (e.g., a gNB confirmation), for example, via a physical downlink control channel (PDCCH) transmission via a dedicated control resource set (CORESET)) (e.g., to indicate receipt of the measurement reporting result(s)). The WTRU may receive an indication of a TCI state group (e.g., via a downlink control information (DCI) scheduling a PDSCH transmission), which may be one of the multiple TCI state groups that was received by the WTRU. The WTRU may determine a TCI state of the indicated TCI state group, for example, based on the WTRU reported measurement(s). The WTRU may receive the scheduled PDSCH transmission, for example, based on the determined TCI state.

In examples, PDSCH reception may be based on a default TCI state in a TCI state group. For example, a WTRU may receive multiple TCI state groups and multiple TCI states, e.g., multiple TCI states for each of the multiple TCI state groups. The WTRU may receive an indication of a TCI state group (e.g., via a PDCCH transmission scheduling a PDSCH transmission), which may be one of the multiple TCI state groups that was received by the WTRU. The WTRU may apply a default TCI state of the indicated TCI state group, for example, if the WTRU didn't report WTRU measurement(s) associated with the TCI states of the indicated TCI state group (e.g., within a time window). The WTRU may receive the scheduled PDSCH transmission, for example, based on the default TCI state.

In examples, PDCCH reception may be based on determination of a TCI state in a TCI state group. For example, a WTRU may receive multiple TCI state groups and multiple TCI states, e.g., multiple TCI states for each of the multiple TCI state groups. A WTRU may measure RSs associated with the multiple TCI states. The WTRU may report WTRU measurement result(s) (e.g., a RSRP value and/or a P-MPR value) associated with the RSs. The WTRU may receive an indication of a TCI state group (e.g., via a MAC CE for a CORESET), which may be one of the multiple TCI state groups that was received by the WTRU. The WTRU may determine a TCI state of the indicated TCI state group, for example, based on the WTRU measurement(s) for the CORESET. The WTRU may receive a PDCCH transmission, for example, based on the determined TCI state.

In examples, a physical uplink control channel (PUCCH) transmission may be based on a determination of a TCI state in a TCI state group. A WTRU may receive multiple TCI state groups and multiple TCI states, e.g., multiple TCI states for each of the multiple TCI state groups. The WTRU may measure RSs associated with the multiple TCI states. The WTRU may report WTRU measurement result(s) (e.g., a RSRP value and/or P-MPR) associated with the RSs. The WTRU may receive a base station confirmation (e.g., a gNB confirmation), for example, via a PDCCH transmission via a dedicated CORESET (e.g., to indicate receipt of the measurement reporting result(s)). The WTRU may receive an indication of a TCI state group (e.g., via a MAC CE), which may be one of the multiple TCI state groups that was received by the WTRU, for a PUCCH resource. The WTRU may determine a TCI state of the indicated TCI state group, for example, based on WTRU measurement(s) associated with the PUCCH resource (e.g., the measurement(s) may be a previously measured RSRP and/or PMPR, such as an RSRP and/or PMPR included in the reported measurements, or RSRP and/or PMPR measurement(s) performed after receiving the indication of the TCI state group). The WTRU may transmit a PUCCH transmission, for example, based on the determined TCI state.

In examples, a physical uplink shared channel (PUSCH) transmission may be based on a determination of a TCI state in a TCI state group. A WTRU may receive multiple TCI state groups and multiple TCI states for one or more of the multiple TCI state groups (e.g.,for each of the multiple TCI state groups). The WTRU may measure RSs associated with multiple TCI states. The WTRU may report WTRU measurement result(s) (e.g., a RSRP value and/or a P-MPR value) associated with the RSs. The WTRU may receive a base station confirmation (e.g., a gNB confirmation), for example, via a PDCCH transmission via a dedicated CORESET(e.g., to indicate receipt of the measurement reporting result(s)). The WTRU may receive an indication of a TCI state group (e.g., via an uplink DCI scheduling a PUSCH transmission), which may be one of the multiple TCI state groups that was received by the WTRU. The WTRU may determine a TCI state of the indicated TCI state group, for example, based on the WTRU measurement(s) (e.g., the measurement(s) may be a previously measured RSRP and/or PMPR, such as an RSRP and/or PMPR included in the reported measurements, or RSRP and/or PMPR measurement(s) performed after receiving the indication of the TCI state group). The WTRU may transmit the scheduled PUSCH transmission.

P-MPR may be used to comply with radiation exposure limits. Specific absorption rate (SAR) and maximum permitted exposure (MPE) may lead to power reductions, for example, triggered by WTRU form factor proximity sensors. P-MPR may not be (e.g., directly) reported as an absolute value in dB in frequencies below 6 GHz (or 10 Ghz in some regions), otherwise known as frequency range one (FR1). P-MPR may be part of a power headroom report (PHR). P-MPR may be guessed (e.g., estimated) by a base station (e.g., a gNB), for example, based on RF properties specific to FR1 technology. P-MPR may be reported (e.g., for MPE, in frequencies above 24 GHz, otherwise known as FR2) as an absolute value (e.g., along with PHR), for example, due to the nature of an FR2 RF front end and high tolerances in this range.

A PHR for SAR, and/or a PHR-like report for MPE may be driven, for example, by time duration(s) associated with PHR and specific to MAC CE (e.g., MAC CE specific PHR timer(s)). A PHR report for SAR with proximity sensors detection may have the following triggering properties. A duration of time (e.g., a timer, which may be phr-Prohibit-Timer) may expire or may have expired, for example, if a MAC entity has UL resources for a new transmission, and if the following is true for an activated serving cell (e.g., any activated serving cell) of a MAC entity (e.g., any MAC entity) with a configured uplink: there are UL resources allocated for transmission or there is a PUCCH transmission on the cell, and the power backoff due to power management (e.g., as may be allowed, specified and/or configured, such as by P-MPRc) for the cell has changed more than a threshold (e.g., phr-Tx-PowerFactorChange dB) since the last transmission of a PHR when the MAC entity had UL resources allocated for transmission or there was a PUCCH transmission on the cell.

A MAC entity may avoid triggering a PHR, for example, if a power backoff due to power management decreases (e.g., only) temporarily (e.g., for up to a few tens of milliseconds). A MAC entity may avoid reflecting a temporary decrease in values of $P_{CMAX,f,c}$/PH, for example, if a PHR is triggered by other triggering conditions.

Using/tracking a duration of time (e.g., a prohibit timer) may avoid a ping pong signaling situation. An extra triggering condition may be related to a duration of time (e.g., an activation timer, e.g., as described herein above), for example, where an occasional short human body proximity detection is avoided.

Similar triggering conditions may be accounted for, for example, for MPE, where an absolute level of P-MPR is reported. For MPE, a first duration of time (e.g., an activation delay timer) and/or a second duration of time (e.g., a prohibit timer) may be used, e.g., for reasons similar to SAR related PHR.

Multi-panel based transmission may be supported in different ways. For example, multi-panel based transmission may be supported by extending a beam management framework with TCI states and spatial relation info (e.g., increasing a maximum number of configured and/or activated TCI states and/or spatial relation information). Extension of a beam management framework may be associated with complexity, power consumption, signaling overhead, and/or an MPE issue.

Complexity implication(s) may result as a number of TCI states/spatial relation information increases, for example, if a WTRU measures (e.g., continuously) RSs (e.g., all RSs) in the activated TCI states and spatial relation information and updates corresponding spatial domain filters. Power consumption implication(s) may result, e.g., if the WTRU measures the RSs and updates spatial domain filters. Signaling overhead (e.g., in DCI and/or MAC CE) implication(s) may result, e.g., from configuring and/or indicating TCI state and/or spatial relation information among an increased number of activated TCI states and/or spatial relation information. Signaling overhead implication(s) may result, e.g., from measuring an increased number of RSs. An extension of a beam management framework may support a unified TCI framework for downlink and uplink. A beam management framework may support MPE-related function(s) for a beam indication (e.g., reducing transmission power of a panel that is in proximity of a WTRU). A beam management framework may support optimized multi WTRU panel transmission in consideration of complexity, power consumption, signaling overhead and MPE-related function(s).

Figure 2:
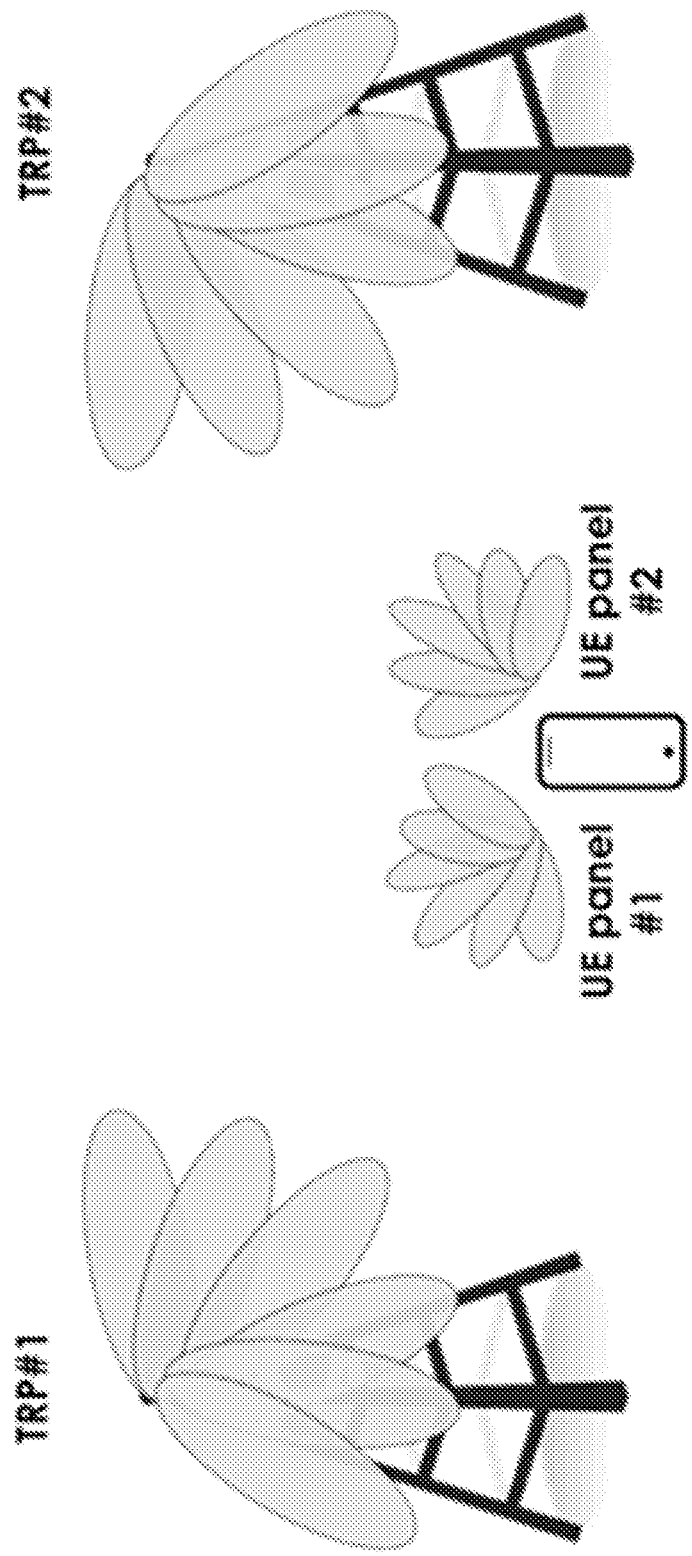
FIG. 2 illustrates an example of multi-panel transmission/reception of a WTRU.
Figure 3:
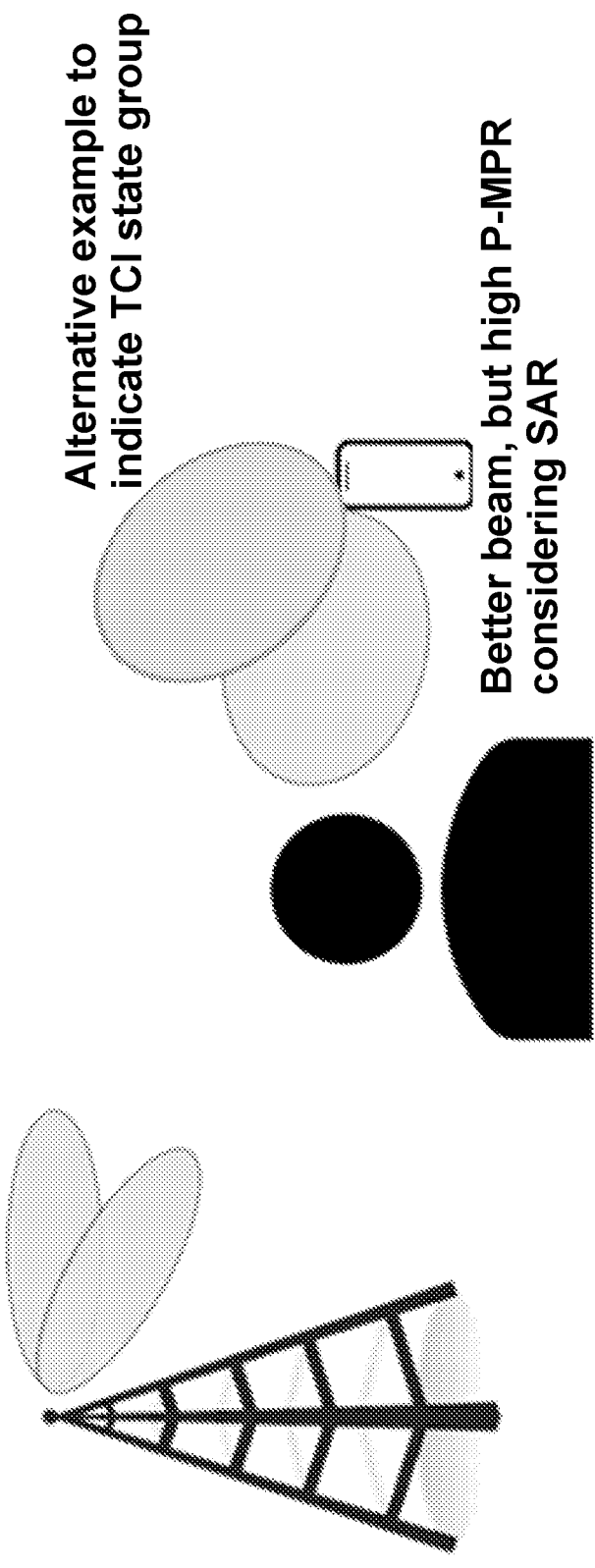
FIG. 3 illustrates an example of a beam indication in consideration of an MPE issue.

FIG. 2 illustrates an example of multi-panel transmission/reception of a WTRU. FIG. 3 illustrates an example of a beam indication in consideration of MPE-related function(s) (e.g., a first beam may be better than a second beam, for example the first beam may have better signal strength than the second beam, but the second beam may be chosen or considered based a PMPR of the first beam, which may be above a threshold, higher than a PMPR associated with the second beam, etc.).

A beam indication may be provided using an explicit or implicit indication, for example, based on a report from a WTRU on one or more of a CSI, Tx power, a PHR, MPE/SAR, PMPR, Pcmax per TCI state group, or the like.

A WTRU may transmit or receive a physical channel transmission or a reference signal, for example, according to at least one spatial domain filter. The term beam may be used to refer to a spatial domain filter and vice versa. A WTRU may transmit a physical channel transmission or a signal, for example, using a same spatial domain filter as the spatial domain filter used for receiving an RS (e.g., a CSI-RS) or a synchronization signal (SS) block. The WTRU transmission may be referred to as a target, and a received RS or SS block may be referred to as a reference or source. A WTRU may (e.g., be said to) transmit a target physical channel transmission or signal according to a spatial relation with a reference to an RS or SS block.

A WTRU may transmit a first physical channel transmission or a first signal according to a spatial domain filter (e.g., a same spatial domain filter) used for transmitting a second physical channel transmission or a second signal. The first transmission/signal and second transmission/signal may be referred to as target, and reference (or source), respectively. A WTRU may be said to transmit the first (or target) physical channel transmission or the first signal according to a spatial relation with a reference to the second (or reference) physical channel transmission or the second signal.

An indication of a spatial relation may be implicit, configured by radio resource control (RRC) signaling, or signaled by a MAC CE or DCI. For example, a WTRU may transmit a PUSCH transmission and a demodulation reference signal (DM-RS) of PUSCH according to a (e.g., implicitly indicated) spatial domain filter associated with a sounding reference signal (SRS) indicated by an SRS resource indicator (SRI) that is indicated in DCI or that is configured by RRC signaling). In examples, a spatial relation may be configured by RRC signaling for an SRI or signaled by a MAC CE for a PUCCH transmission. A spatial relation may be referred to as a beam indication.

A WTRU may receive a first (or target) downlink channel transmission or a first signal according to a same spatial domain filter or spatial reception parameter as a second (or reference) downlink channel transmission or a second signal. For example, an association may exist between a physical channel transmission, such as a PDCCH or PDSCH transmission, and a respective DM-RS. An association may exist (e.g., at least when the first and second signals are reference signals), for example, if a WTRU is configured with (e.g., via configuration information) a quasi-colocation (QCL) assumption type D between corresponding antenna ports. An association may be configured as a TCI state. An association between a CSI-RS or SS block and a DM-RS may be indicated (e.g., to a WTRU), for example, by an index to a set of TCI states (e.g., configured by a RRC message and/or signaled by a MAC CE). The indication may be referred to as a beam indication.

A beam indication procedure may be modified with a WTRU multi-panel. A TCI state may be used interchangeably with beam, spatial relation information, spatial domain filter, SRS resource indicator (SRI), and SRS resource set indicator.

TCI state group may be used interchangeably with TCI state set, CSI-RS resource set, CSI-RS resource group, SRS resource set, SRS resource group, spatial relation group, spatial relation set, and spatial relation info group and spatial relation set.

CSI-RS resource set may be used interchangeably with CSI-RS resource, CSI-RS resource configuration, CSI measurement configuration, CSI resource configuration, CSI-RS trigger state (e.g., for triggering aperiodic CSI-RS and/or semi-persistent CSI-RS), and CSI report configuration.

SRS resource set may be used interchangeably with SRS resource, SRS resource configuration, SRS measurement configuration, and SRS trigger state (e.g., for triggering aperiodic SRS and/or semi-persistent SRS).

CORESET may be used interchangeably with search space, CORESET pool, CORESET pool ID, transmission/reception point (TRP), and TRP ID (e.g., with a higher layer index).

A WTRU may indicate and/or receive an indication of one or more TCI state groups to determine one or more TCI states, for example, to support one or more of following: transmission of a PUCCH, transmission of a PUSCH, reception of a PDCCH, reception of a PUSCH, transmission of RS(es) (e.g., SRS), reception of RS(es) (e.g., CSI-RS and/or SSB), and/or the like.

Information (e.g., configuration information) may be used to indicate and/or determine a TCI state group. Configuration information (e.g., indicated via one or more signals/messages, such as RRC messages) may be used for a TCI state group indication and/or determination.

A WTRU may be configured with (e.g., via configuration information) one or more TCI states, which may include one or more of the following: joint TCI states for DL/UL signals and channel transmissions; DL TCI states for a PDCCH transmission; DL TCI states for a PDSCH transmission; DL TCI states for a DL RS transmission (e.g., a CSI-RS, a SSB, etc.); UL TCI states for a PUCCH transmission; UL TCI states for a PUSCH transmission; UL TCI states for a physical random access channel (PRACH) transmission; UL TCI states for a UL RS transmission (e.g., SRS, etc.); or the like.

A WTRU may be configured with (e.g., via configuration information) one or more CORESETs. The one or more TCI state groups (e.g., each of the one or more TCI state groups) may be associated with one or more CORESETs. In examples, a WTRU may be configured with (e.g., via configuration information) a first CORESET, a second CORESET, a first TCI state group and a second TCI state group. The first CORESET may be associated with the first TCI state group and the second CORESET may be associated with the second TCI state group. In examples, a WTRU may be configured with (e.g., via configuration information) one or more CORESETs. A first subset of the one more CORESETs may be associated with a first TCI stage group and a second subset of the one or more CORESETs may be associated with a second TCI state group. The first TCI state group and the second TCI state group may be a same TCI state groups or different TCI state groups, e.g., based on a mode of operation.

A WTRU may be configured with (e.g., via configuration information) one or more of TCI state groups. The one or more TCI state groups (e.g., each of the one or more TCI state groups) may be associated with one or more TCI states. In examples, a WTRU may be configured with (e.g., via configuration information) a first TCI state, a second TCI state, a first TCI state group and a second TCI state group. The first TCI state may be associated with the first TCI state group and the second TCI state may be associated with the second TCI state group. In examples, a WTRU may be configured with (e.g., via configuration information) one or more TCI states. A first subset of the configured TCI states may be associated with (e.g., all or part of) a first TCI stage group and a second subset of the configured TCI states may be associated with (e.g., all or part of) a second TCI state group. The first subset and the second subset of TCI states may include non-overlapped TCI states. The first subset and the second subset of TCI states may include partially overlapped TCI states.

A WTRU may be configured with (e.g., via configuration information) one or more uplink resources (e.g., one or more of PUCCH resources, PUSCH resources, PRACH resources, and/or the like). The one or more TCI state groups (e.g., each of the one or more TCI state groups) may be associated with the one or more uplink resources. In examples, a WTRU may be configured with (e.g., via configuration information) a first uplink resource, a second uplink resource, a first TCI state group and, a second TCI state group. The first uplink resource may be associated with the first TCI state group and the second uplink resource may be associated with the second TCI state group.

An association between TCI states, CORESETs and TCI state groups may be based on one or more of the following: a configuration of a TCI state group ID in one or more of a TCI state, a CORESET, or a TCI state group (e.g. an indication of a TCI state group ID may be based on at least one of a RRC message, a MAC-CE, or a DCI); a configuration of one or more TCI state IDs and/or CORESET IDs in a TCI state group (e.g., an indication of TCI state IDs and/or CORESET IDs may be based on at least one of a RRC message, a MAC-CE, or a DCI); a configuration of a cell ID (e.g., TCI states and TCI state group configured with (e.g., via configuration information) an identical cell ID (or no cell ID) may be associated); a configuration of a panel ID (e.g., TCI states and TCI state group configured with (e.g., via configuration information) an identical panel ID (or no panel ID) may be associated); a configuration of a CORESET pool ID (e.g., TCI states and TCI state group configured with (e.g., via configuration information) an identical CORESET pool ID (or no CORESET pool ID) may be associated); a configuration of an SRS resource set ID (e.g., TCI states and TCI state group configured with (e.g., via configuration information) an identical SRS resource set ID (or no SRS resource set ID) may be associated); a configuration of a CSI-RS resource set ID (e.g., TCI states and TCI state group configured with (e.g., via configuration information) an identical CSI-RS resource set ID (or no CSI-RS resource set ID) may be associated); or the like.

A TCI group may be used in one or more modes of operation. A WTRU may determine a mode of operation, for example, from a first mode of operation (e.g., a TCI state indication/determination) and a second mode of operation (e.g., a TCI state group indication/determination and a TCI state indication/determination of the indicated/determined TCI state group). A WTRU may determine one or more TCI states for transmitting and/or receiving signal(s) and/or transmission for channel(s) and/or signals, for example, in a first mode of operation (e.g., a TCI state indication/determination). Signaling may be based on one or more of RRC, MAC CE or DCI. In some examples, a WTRU may receive an indication from a gNB, which may include one or more of following: a gNB indication of one or more TCI states/

SRIs (e.g., via a RRC message); a gNB indication of one or more TCI states/SRIs (e.g., via a MAC CE); a gNB activation of multiple TCI states/SRIs (e.g., via a MAC CE) and a gNB indication of one or more TCI states/SRIs of the multiple TCI states/SRIs (e.g., via DCI); or the like.

A WTRU may determine one or more TCI state groups and TCI states (e.g., based on one or more procedures described herein), for example, in a second mode of operation (e.g., a TCI state group indication/determination and a TCI state indication/determination of the indicated/determined TCI state group).

Modes of operation may be determined and/or used, for example, based on one or more of the following: a configuration of a TCI state group; a configured number of TCI states; a WTRU capability and/or a gNB configuration (e.g., based on WTRU capability reporting); a WTRU request for a preferred mode of operation for beam failure recovery; or the like.

A mode of operation may be determined based on, for example, a configuration of a TCI state group. In an example, a WTRU may determine a first mode of operation (e.g., a TCI state indication/determination), for example, if the WTRU is configured with (e.g., via configuration information) one or more TCI states without one or more associated TCI state groups. A WTRU may determine a second mode of operation (e.g., a TCI state group indication/determination and TCI state indication/determination of the indicated/determined TCI state group), for example, if the WTRU is configured with (e.g., via configuration information) one or more TCI states and one or more associated TCI state groups. In an example, a WTRU may determine a first mode of operation (e.g., a TCI state indication/determination), for example, if the WTRU is configured with (e.g., via configuration information) one or more CORESETs without one or more of associated TCI state groups. A WTRU may determine a second mode of operation (e.g., a TCI state group indication/determination and a TCI state indication/determination of the indicated/determined TCI state group), for example, if the WTRU is configured with (e.g., via configuration information) one or more CORESETs and one or more associated TCI state groups.

A mode of operation may be determined based on a configured number of TCI states. A WTRU may determine a first mode of operation (e.g., a TCI state indication/determination), for example, if the WTRU is configured with (e.g., via configuration information) one or more TCI states and if a number of one or more TCI states is lower than (or equal to) a threshold (e.g., X). A WTRU may determine a second mode of operation (e.g., a TCI state group indication/determination and TCI state indication/determination of the indicated/determined TCI state group), for example, if the WTRU is configured with (e.g., via configuration information) one or more TCI states and if a number of the one or more TCI states is higher than the threshold (e.g., X). A threshold may be based on one or more of: a predefined value; or a gNB indication (e.g., via one or more of a DCI, a MAC CE, or a RRC message). A TCI state group for a TCI state (e.g., each TCI state) may be determined, for example, based on orders of configurations. A TCI state may be associated with a first TCI state group, for example, if an order of a TCI state (e.g., a configuration order or TCI state ID) is lower than a threshold. A TCI state may be associated with a second TCI state group, for example, if the order of the TCI state is higher than threshold.

A mode of operation may be determined, for example, based on a WTRU capability and/or a gNB configuration (e.g., based on WTRU capability reporting).

A WTRU may request a mode (e.g., a preferred mode) of operation for beam failure recovery. A WTRU may indicate to a gNB a mode (e.g., a preferred mode) of operation, for example, if the WTRU is capable of supporting multiple (e.g., both) modes of operation, such as a first mode (e.g., a TCI state group indication/determination and TCI state indication/determination of the indicated/determined TCI state group) and a second mode (e.g., a TCI state indication/determination) and if measurement(s) at the WTRU indicate a preferred mode of operation. A WTRU may indicate the first mode of operation (e.g., a TCI state group indication/determination and a TCI state indication/determination of the indicated/determined TCI state group) as a preferred mode of operation, for example, if the WTRU uses or is configured to use dynamic panel activation/deactivation (e.g., due to fast fading channel, beam failure, MPE/SAR, and/or the like). A WTRU may indicate a second mode of operation (e.g., a TCI state indication/determination), for example, if the WTRU does not use or is not configured to use dynamic panel activation/deactivation (e.g., due to slow fading channel, and/or the like).

A TCI state group indication may be triggered. A WTRU may trigger transmission of a TCI state group indication, for example, based on at least one of following: a TCI state group metric; a request for a TCI state group indication; a beam failure detection; transmission and/or contents of a TCI state group indication; or the like.

A WTRU may trigger transmission of a TCI state group indication, for example, based on at least one TCI state group metric. A TCI state group metric may include, for example, of at least one of the following: a measurement (e.g., a measurement of CSI-RSRP, CSI-RSRQ, CSI-SINR, SS-RSRP, SS-RSRQ, or SS-SINR); a measurement related to beam management or channel state information (e.g., a measurement of CQI, L1-RSRP, or L1-SINR); a metric related to a transmission power that may be used if the WTRU operates with the TCI state group (e.g., a metric of transmission power, power headroom, a configured maximum power defined for a TCI state group, a power-management maximum power reduction, which may be related to MPE or SAR, or the like); or the like.

A TCI state group metric may be specific to a TCI state group. A WTRU may determine a TCI state group metric for a TCI state group in use (e.g., a TCI state group that is currently used) and/or for other TCI state groups (e.g., (e.g., additional TCI state groups configured by higher layer(s) signaling).

In the case that a TCI state group metric includes a measurement, a WTRU may determine one or more resources for the measurement (e.g., a measurement of a reference signal such as CSI-RS or SS) from, for example, at least one of the following: a set of RSs configured in a TCI state (e.g., each TCI state) of the TCI state group; at least one RS separately configured for each TCI state group (e.g., to evaluate the TCI state group metric). An RS may be signaled, for example, by a RRC message or a MAC CE.

A WTRU may determine a TCI state group metric from one or more RSs (e.g., multiple RSs). A WTRU may take an average of measurements over multiple RSs, or a subset thereof. A subset may include N RSs with a highest measurement value, or a set of RSs for which a measurement value is above a threshold. A threshold and/or N may be pre-defined or configured (e.g., by higher layer(s) signaling).

A WTRU may trigger transmission of a TCI state group indication, for example, if at least one of the following occurs: a metric for a TCI state group (e.g., a TCI state group in use or currently used) becomes lower than a threshold; or a metric for a TCI state group (e.g., a TCI state group in use or currently used) becomes lower than a metric for another TCI state group, e.g., plus or minus an offset. A threshold or offset may be configured (e.g., by higher layer(s) signaling), for example, for each TCI state group.

A TCI state group indication may be requested. A WTRU may trigger transmission of a TCI state group indication, for example, upon reception of an indication (or a request) from a network. For example, an indication may be signaled via a MAC CE or via physical control signaling (e.g., via a DCI). An indication may include a list of TCI state groups, for example, a list of TCI state groups for which to report corresponding TCI state group metric(s) or a list of TCI state groups from which the WTRU may select a TCI state group for a TCI state group indication.

A WTRU may trigger transmission of a TCI state group indication, for example, based on (e.g., upon) detection of a beam failure.

A WTRU may transmit a TCI state group indication, for example, using at least one of the following: physical layer signaling (e.g., a UCI, such as a scheduling request (SR), a link recovery request (LRR), and/or a CSI); a MAC CE; RRC signaling (e.g., a measurement report); a physical random access channel (PRACH) transmission; a sounding reference signal (SRS); or the like.

A WTRU may indicate a TCI state group (e.g., a preferred TCI state group, or a TCI state group maximizing a metric), for example, using at least one of the following: an indication (e.g., an explicit indication), for example, using an index associated with the TCI state group; an indication (e.g., an implicit indication), for example, by transmitting over a resource associated with the TCI state group indication. For example, a resource may be an SR resource, an SRS resource, a PRACH preamble, or the like. A WTRU may determine an associated resource, for example, from higher layer signaling (e.g., RRC or MAC).

A WTRU may include result(s) of a TCI state group metric for at least one TCI state group. For example, a WTRU may include the identity/identities and result(s) for N TCI state group(s) with certain metric(s) (e.g. best metric(s)). The value of N may be pre-defined or configured (e.g., by higher layer(s) signaling).

TCI state group indication(s) may be signaled. A dedicated CORESET may be used to provide a confirmation. A WTRU may perform measurement(s) on one or more groups of beams that may be configured by a base station (e.g., a gNB), for example, to reduce a measurement burden and/or reduce power consumption by a WTRU. A WTRU may report beam measurement(s), for example, on a per beam group basis (e.g., a WTRU may indicate a hierarchy of quality for each beam, e.g., for each beam group). A base station (e.g., a gNB) may (e.g., based on reported beam measurement(s), for example, on a per beam group basis) configure (e.g., through an RRC reconfiguration message) and/or activate (e.g., through a MAC CE message) one or more TCI states (e.g., extended TCI states). The one or more extended states (e.g., each of the one or more extended states) may include as an extension, for example, one or more (e.g., any combination) of the following information fields: a group of beam indexes with or without related PCI or a serving cell id (e.g., if inter-cell mobility is targeted by the gNB); a specific (e.g., selected or indicated) search space that may be associated with a CORESET for a specific group of beams; a number of PDCCH channels for a beam group in an associated CORESET; a specific or implicit rule for PDCCH decoding associated with a beam or beam group; associated uplink resources per panel or panel IDs (e.g., if the WTRU reports the information in its capabilities); a type of DL/UL TCI relation (e.g., common per panel or disjointed (e.g., panel resource specific)); or the like.

A WTRU may provide information for a TCI state configuration (e.g., an extended TCI state configuration). For example, for (e.g. upon receiving or determining) an extended TCI state configuration, a WTRU may report one or more beam measurements and/or P-MPR, which may be related to an MPE/SAR triggered situation (e.g., an MPE/SAR triggered situation related to a panel or group of WTRU antenna panel(s)). Beam/beam group measurement report(s) and/or P-MPR for MPE-SAR related report(s) may be complementary and/or triggered by different factors. Beam/beam group measurement report(s) and/or P-MPR for MPE-SAR related report(s) may be reported simultaneously or quasi-simultaneously, for example, based on beam reciprocity on FR2. A base station (e.g., a gNB) may take similar beam management actions for DL and UL TCI states, or may take different beam management actions for DL and UL TCI states. In an example, uplink TCI changes/activation (e.g., only uplink TCI changes/activation) may be necessary, for example, for an MPE/SAR situation that does not match a downlink beam degradation. In an example (e.g., in a FR2 operation), where strong downlink/uplink reciprocity may be expected, a base station (e.g., a gNB) may act in downlink and uplink TCIs. A base station (e.g., a gNB) may configure and associate DL with UL TCIs for a more dynamic beam/panel change with low latency, e.g., in some situations, such as FR1 or FR2.

A TCI state may be activated through a MAC CE message. The beam may be indicated in a DCI command, for example, if a scheduled PDSCH starts N symbols after a last PDCCH symbol. A WTRU may assume (e.g., implicitly) the same QCL properties as the received PDCCH (e.g., if a TCI state is not activated through a MAC CE message).

An activation process of a TCI state based on one or more of beam specific PDCCHs, may speed up, for example, using physical layer procedure(s).

A WTRU may report beam group based measurements, which may be triggered by beam quality related events or MPE/SAR, reported through RRC (beam quality measurements), CSI feedback on UL physical channels, or MAC CE (PHR or P-MPR reports). A WTRU may follow different procedures according to the type of report (e.g., RRC, MAC or PHY) sent to a base station (e.g., a gNB), e.g., based on reported beam group based measurements.

A WTRU operation may include an RRC beam group quality report and follow up operation. If a WTRU reports beam group quality report(s) (e.g., through RRC, which may be based on configured event(s)), the WTRU may be configured with (e.g., via configuration information) TCIs (e.g., the TCIs associated with the beam group) to a reported beam (e.g., a new, better reported beam). A WTRU may start to monitor PDCCH configured channels in a configured, associated CORESET for a reported beam group (e.g., a new, best reported beam group), for example, in response to (e.g., upon) sending the beam group quality report. A WTRU may start monitoring a PDCCH search space/CORESET (e.g., a new PDCCH search space/CORESET), for example, in response to (e.g., after) a defined/configured number of slots or symbols. A time window may be configured and/or defined, for example, by a WTRU capability. A WTRU capability may be common or different for downlink and uplink. A time window may be related to panel switching and/or activation time. A WTRU may consider a beam (e.g., a new, best quality beam) and an associated TCI as stable for active reception, for example, in response to (e.g., upon) reception of a WTRU dedicated PDCCH transmission associated with a beam from a reported beam group (e.g., a reported best quality beam group). A WTRU may return to a previous TCI state and may consider a state stable, for example, if the WTRU does not decode PDCCH transmission(s) (e.g., any PDCCH transmissions) associated with the reported beam group in the WTRU's defined search space/CORESET/PDCCH channels for a defined/configured number of slots. The WTRU may retransmit the RRC report and may restart the PDCCH monitoring process (e.g., the new PDCCH monitoring process as described herein), for example, if triggering conditions and associated time durations (e.g., timers) for the PDCCH monitoring process permit.

A WTRU operation may include a MAC CE beam group quality report and follow up operation. A WTRU may report a P-MPR or PHR value related to beam quality over a MAC CE. The WTRU may wait for a MAC CE acknowledgement (e.g., a MAC CE acknowledgement from a base station, such as gNB) and may start monitoring a beam group (e.g., a reported best quality beam group) by monitoring search space/CORESET/PDCCH channels associated with the beam group. A WTRU may start monitoring the beam group by monitoring search space/CORESET/PDCCH channels associated with the beam group, for example, after a defined/configured number of slots. Selection(s) of beam group and search space/CORESET/PDCCH channels to monitor may be linked/associated with an uplink TCI state that may be defined per panel ID(s), for example, for a P-MPR cause related to an MPE/SAR event. The WTRU may follow (e.g., implicitly) an uplink TCI change for a downlink TCI and vice versa, for example, depending on a common or disjointed TCI downlink/uplink configuration.

A WTRU operation may include a MAC CE beam group quality report and follow up operation. The WTRU may report beam group CSI quality, for example, using uplink physical channel(s) (e.g., PUCCH or UCI in PUSCH), which may be based on a defined or configured quality threshold. If the WTRU reports beam group CSI quality (e.g., as described herein), the WTRU may start monitoring search space/CORESET/PDCCH group channel associated with a best reported beam group quality, for example, after a certain defined/defined number of slots (e.g., following a procedure described herein).

A WTRU operation may include an inter-cell mobility or multiple TRP (M-TRP) with beam group quality report and follow-up operation. Procedures (e.g., as described herein) may be applicable for beam group quality reporting, for example, if a WTRU is configured with (e.g., via configuration information) a different PCI, or a different serving cell for inter-cell mobility or inter-cell TRP. A WTRU may use search space/CORESET/PDCCH group monitoring (e.g., as described herein) for mobility. A WTRU may receive a WTRU dedicated PDCCH transmission in a beam (e.g., a new beam), e.g., based on (e.g., pertaining to) a reported beam group quality. The WTRU may send an acknowledgement to a network, for example, on uplink resources (e.g., newly associated uplink resources) for completion of cell change/handover. If inter-cell M-TRP cell change is targeted, the WTRU may start monitoring search space/CORESET/PDCCH group (e.g., for a dedicated WTRU PDCCH) associated with a cell (e.g., a new defined/configured cell), for example, in response to (e.g., after) reporting the beam group quality (e.g., the new beam group quality). The WTRU may receive a dedicated WTRU PDCCH transmission in the associated PDCCH group (e.g., the new associated PDCCH group). The WTRU may consider the dedicated WTRU PDCCH in the associated PDCCH group as an active TCI (e.g., a new active TCI) and may send an acknowledgement (e.g., on an anchor cell or a new cell) or may start (e.g., implicitly) operation, for example, if the uplink resources acknowledge (e.g., implicitly) the cell change. The uplink resources may be defined/configured per serving cell/PCI, for example, during the initial WTRU TCI for downlink/uplink configuration.

The WTRU may return to previous active TCI state(s) and may continue beam group quality evaluation (e.g., and may re-initiate the process, reset time durations (e.g., reset timers), and restart the process if/when the defined/configured conditions are met again), for example, if there is a failure to detect a WTRU dedicated PDCCH transmission in a targeted search space/CORESET/PDCCH group for a number of slots (e.g., a certain defined/configured number of slots).

A based station (e.g., a gNB) may establish PDCCH beam group association rules. The gNB may configure a beam group for measurements. A corresponding TCI state may be activated. For example, based on a beam group configured by the gNB for measurements and a corresponding activated TCI state, the gNB may establish rules for PDCCH decoding. The gNB may establish rules for PDCCH decoding (e.g., under a certain search space/CORESET), for example, to minimize blind decoding trial and reduce WTRU processing time. Beam group rules may include one or more of the following rules: (a) the PDCCH candidates may be associated in order with the beam index in a decreasing or increasing order; (b) if the beam group has an increased number of beams, the PDCCH channel may be grouped into a maximum number of N candidates and a WTRU may use a formula (e.g., PDCCH group channel index ID=BeamIndex mod (N)); (c) the WTRU may follow (e.g., in a circular manner) the PDCCH candidates for group decoding and detection, for example, if a number of beam candidates is higher than a maximum of N PDCCH channels candidates.

A WTRU may be configured with (e.g., via configuration information) PDCCH channel candidates in a different CORESET or multiple CORESETs. The number of blind decoding trials per CORESET may be reduced. One or more rules may be used/applied, for example, to speed up the process. In some examples, a WTRU may use one or more of the following rules (e.g., inside a different CORESET): (a) PDCCH channel index ID=(CORESET Index+BeamIndex) mod(N), where N may be the maximum number of PDCCH channel candidates that a WTRU may search and where the PDCCH channel index may be unique; (b) a WTRU may use a BeamIndex mod(N) equation to determine a maximum number of decoding trials for configured PDCCHs candidates (e.g., where any of the candidates may be used by a base station (e.g., a gNB)); or (c) a randomization operation for gNB PDCCH load distribution may be performed. The randomization operation may involve a WTRU associated cell radio network temporary identifier (C-RNTI). The randomization operaton may involve a best beam index reported combined with a WTRU associated C-RNTI. In an example, PDCCH channel index ID=(C-RNTI+BeamIndex) mod(N) may return a PDCCH channel index to decode or a maximum number of decoding cases, PDCCH higher index, that the WTRU may search for. N may be the maximum number of PDCCH channels that the WTRU may (e.g., attempt to) decode, where N may be configurable or a WTRU capability.

A WTRU may determine one or more TCI state groups based on an RRC based indication. A WTRU may determine one or more TCI state groups for processing, transmitting, and/or receiving channels and/or signals, for example, based on one or more RRC messages.

A WTRU may be configured with (e.g., via configuration information) one or more CORESETs. The one or more CORESETs (e.g., each of the one or more CORESETs) may comprise or be associated with one or more TCI state groups. A WTRU may determine the one or more TCI state groups for PDCCH reception and/or PDSCH reception, e.g., based on the configuration. In examples, a WTRU may be configured with (e.g., via configuration information) a first set of CORESET(s) associated with a first TCI state group, and a second set of CORESET(s) associated with a second TCI state group. A set (e.g., the first set or the second set) may include one or more CORESETs. A WTRU may determine one or more TCI state groups, for example, based on the association between the first set of CORESET(s) and the first TCI state group or the association between the second set of CORESET(s) and the second TCI state group. In examples, the WTRU may determine the first TCI state group for PDCCH reception, for example, if the WTRU blindly decodes the first set of CORESETs. The WTRU may determine the second TCI state group for PDCCH reception, for example, if the WTRU blindly decodes the second set of CORESETs. The WTRU may determine the first TCI state group for receiving the one or more PDSCH transmissions, for example, if the WTRU monitors, attempts to decode, or receives one or more PDCCH transmissions scheduling one or more PDSCH transmissions via a CORESET in the first set of CORESETs. The WTRU may determine the second TCI state group for receiving the one or more PDSCH transmissions, for example, if the WTRU monitors, attempts to decode, or receives one or more PDCCH transmissions scheduling one or more PDSCH transmissions via a CORESET in the second set of CORESETs. A TCI state group for a PDSCH may be determined, for example, based on the TCI state group used for monitoring the associated PDCCH.

In examples, a WTRU may be configured with (e.g., via configuration information) one or more TCI state groups per usage. A WTRU may determine the one or more TCI state groups for each usage, (e.g., based on the configurations). A usage may be one or more of the following: a PDCCH reception; a PDSCH reception; a DL RS reception; a PUCCH transmission; a PUSCH transmission (e.g., including a dynamic grant and/or a configured grant); a PRACH transmission; or a UL RS transmission.

In examples, a WTRU may be configured with (e.g., via configuration information) one or more CSI-RS resource sets and/or SRS resource sets. A configuration (e.g., each configuration) of the one or more CSI-RS resource sets and/or SRS resource sets may comprise or be associated with one or more TCI state groups. A WTRU may determine the one or more TCI state groups for CSI-RS reception and/or SRS transmission, e.g., based on the configuration.

In examples, a WTRU may be configured with (e.g., via configuration information) one or more configured grant configurations. A configuration (e.g., each configuration) of the one or more configured grant configurations may comprise one or more TCI state groups. A WTRU may determine the one or more TCI state groups for transmitting PUSCH, e.g., based on the configuration.

In examples, a WTRU may be configured with (e.g., via configuration information) one or more uplink resources (e.g., PUCCH/PUSCH resources for HARQ ACK/NACK, scheduling request, SRS resource sets, PRACH resources, etc.). An uplink resources (e.g., each of the one or more uplink resources) may be associated with one or more TCI state groups. A WTRU may determine the one or more TCI state groups, e.g., based on the configuration. For example, a WTRU may be configured with (e.g., via configuration information) a first one or more uplink resources that may be associated with a first TCI state group, and a second one or more uplink resources that may be associated with a second TCI state group. A WTRU may determine one or more TCI state groups, e.g., based on the association. In examples, based on the association, TCI state group(s) may be determined, for example, based on one or more of following. The WTRU may determine the first TCI state group, for example, if the WTRU transmits uplink channels/signals in the first one or more uplink resources. The WTRU may determine the second TCI state group, for example, if the WTRU transmits uplink channels/signals in the second one or more uplink resources.

A WTRU may determine one or more TCI state groups based on a MAC CE based indication. A WTRU may determine one or more TCI state groups for processing channels and/or signals, for example, based on a MAC CE.

In examples, a WTRU may be configured with (e.g., via configuration information) multiple CORESETs. The WTRU may receive one or more indications (e.g., via MAC CE(s)) of one or more TCI state groups (e.g., TCI state group IDs) for one or more CORESETs of the multiple CORESETs. A WTRU may, determine the one or more TCI state groups for PDCCH reception and/or PDSCH reception, e.g., based on the one or more indications. For example, a WTRU may be configured with (e.g., via configuration information) a first one or more CORESETs and a second one or more CORESETs. The WTRU may receive one or more indications (e.g., via MAC CE(s)) indicating a first TCI state group for the first one or more CORESETs and a second TCI state group for the second one or more CORESETs. In examples, based on the one or more indications, the WTRU may determine a TCI state group, for example, based on one or more of following. The WTRU may determine the first TCI state group for PDCCH reception, for example, if (e.g., when) the WTRU blindly decodes the first one or more CORESETs. The WTRU may determine the second TCI state group for PDCCH reception, for example, if (e.g., when) the WTRU blindly decodes the second one or more CORESETs. The WTRU may determine the first TCI state group for receiving the one or more PDSCH transmissions, for example, if the WTRU receives one or more PDCCH transmissions scheduling one or more PDSCH transmissions via the first one or more CORESETs. The WTRU may determine the second TCI state group for receiving the one or more PDSCH transmissions, for example, if the WTRU receives one or more PDCCH transmissions scheduling one or more PDSCH transmissions via the second one or more CORESETs.

In examples, a WTRU may receive one or more indications indicating one or more TCI groups per usage. A WTRU may determine the one or more TCI state groups for each usage, e.g., based on the indications.

In examples, a WTRU may receive one or more indications indicating one or more TCI groups per CSI-RS resource set and/or SRS resource set. A WTRU may determine one or more TCI state groups for receiving a CSI-RS resource set and/or transmitting a SRS resource set, e.g., based on the indication.

In examples, a WTRU may receive one or more indications indicating one or more TCI groups per configured grant configuration. A WTRU may determine one or more TCI state groups for transmitting PUSCH transmission(s), e.g., based on the indication.

A WTRU may determine one or more TCI state groups based on a DCI-based Indication. A WTRU may indicate a preferred TCI state group, for example, based on certain criteria, e.g., MPE, blockage, etc. A WTRU may determine the preferred TCI state group, for example, by a DCI.

A preferred TCI state group may be indicated, for example, by the content of a DCI, e.g., an index. In examples, a WTRU may receive one or more possible TCI state group pair combinations (e.g., all possible TCI state group pair combinations), e.g., through an RRC configuration. A pair (e.g., each pair) may be represented by an index. The WTRU may receive a DCI containing an index pointing to the preferred TCI state group. In examples, a WTRU may receive a MAC CE indicating a one or more possible TCI state groups (e.g., a subset of possible TCI state groups). A DCI may select a preferred TCI state from a subset of TCI state groups (e.g., the subset of possible TCI state groups).

A preferred TCI state group may be indicated, for example, by an RNTI, e.g., TSG1-RNTI, TSG2_RNTI, etc. In examples, a WTRU may receive one or more possible TCI state group pair combinations (e.g., all possible TCI state group pair combinations), e.g., through an RRC configuration. A pair (e.g., each pair) may correspond to a TSGx-RNTI. A WTRU may receive a DCI to activate a TCI state group (e.g., a new TCI state group). A WTRU may determine the preferred TCI state group, for example, by identifying the TSGx-RNTI used for scrambling the DCI.

A preferred TCI state group may be indicated by an attribute of DCI, e.g., DCI format, size, etc. In examples, a WTRU may receive one or more possible TCI group pair combinations (e.g., all possible TCI group pair combinations), e.g., through an RRC configuration. A pair (e.g., each pair) may be represented by an index. A WTRU may determine the preferred TCI group from the format of the received DCI. For example, a WTRU may determine a preferred TCI group, for example, if (e.g., when) the received DCI is a format 1-1 (e.g., versus if (e.g., when) a fallback DCI format 1-0 is received).

A WTRU may determine one or more TCI state groups for indicated or determined usages, for example, based on DCI. For example, a WTRU may receive one or more indications of one or more TCI state groups (e.g., TCI state group IDs) and one or more indications of usage. A WTRU may determine the one or more TCI state groups for a usage (e.g., each usage), e.g., based on the one or more indications. In examples, a usage may be one or more of following: a PDCCH reception; a PDSCH reception; a DL RS reception; a PUCCH transmission; a PUSCH transmission (including dynamic grant and/or configured grant; a PRACH transmission; a UL RS transmission; or the like.

A DCI may be one or more of the following: a WTRU specific DCI, a group DCI, an uplink DCI, a downlink DCI, or the like.

A WTRU may be indicated a TCI state group (e.g., receive an indication about a TCI state group) and one or more TCI states within the indicated state group (e.g., for one or more indicated or determined usages). An indication of a TCI state group and an indication of one or more TCI states may be in a same DCI field or separate DCI fields. In an example, a TCI indication field in a DCI for PDSCH or PUSCH scheduling may be used to indicate TCI state group ID and one or more TCI states.

A WTRU may determine a TCI state group for one or more indicated or determined usages (e.g., PDSCH or PUSCH), for example, based on an associated CORESET. One or more TCI states in the determined TCI state group may be indicated, for example, in a DCI, e.g., for the indicated or determined usages (e.g., PDSCH or PUSCH).

A WTRU may determine one or more TCI state groups based on a resource-based indication. A preferred TCI group may be indicated, for example, through a linkage to configured resources. In examples, a WTRU may receive one or more possible TCI group pair combinations (e.g., all possible TCI group pair combinations), e.g., through an RRC configuration. A pair (e.g., each pair) may correspond to a subset of resources. A WTRU may receive control information through a DCI. A WTRU may determine a preferred TCI state group, for example, by determining which of the RRC configured resources is indicated explicitly or implicitly by the received DCI.

In examples, a WTRU may receive an RRC configuration indicating multiple potential scheduling options, e.g., frequency/time resources, etc., for a PDSCH reception. A scheduling option (e.g., each of the multiple potential scheduling option) may correspond to a TCI state pair. A WTRU may receive a DCI to schedule a downlink transmission. A WTRU may determine a preferred TCI state group, for example, by decoding the scheduling information. In examples, a WTRU may receive an RRC configuration indicating multiple potential scheduling options for operation in SPS mode, e.g., frequency/time resources, etc., for a PDSCH reception. A SPS configuration mode (e.g., each SPS configuration mode) may correspond to a TCI state pair. A WTRU may receive a DCI to activate a configured grant SPS transmission. A WTRU may determine a preferred TCI state group, for example, based on (e.g., according to) the configured SPS transmission configuration. A WTRU may apply the determined TCI group, for example, based on activation of the SPS transmission.

In examples, a WTRU may receive an RRC configuration indicating multiple potential MCS options for a scheduled PDSCH reception. A MCS option (e.g., each MCS option) may correspond to a TCI state pair. A WTRU may receive a DCI to schedule a downlink transmission. A WTRU may determine a preferred TCI state group, for example, by decoding the MCS information.

A CSI-RS framework may operate (e.g., in NR), for example, based on multiple (e.g., three main) configuration objects, which may include one or more of the following: CSI-ReportConfig (e.g., N1 Reporting Settings); CSI-ResourceConfig (M1 Resource Settings); or list(s) of trigger states (e.g., CSI-AperiodicTriggerStateList and/or CSI-SemiPersistentOnPUSCH-TriggerStateList). In examples, a WTRU may receive an RRC configuration indicating multiple potential configuration options for one or more of the CSI-RS configuration objects. A option (e.g., each option) may correspond to a TCI state pair. A WTRU may determine a preferred TCI group, for example, through the determined CSI-RS configuration option.

A WTRU may determine one or more TCI state groups based on an RRC, a MAC CE, and/or a DCI based indication. A WTRU may determine one or more TCI state groups for processing, transmitting, or receiving channels and/or signals, for example, based on a MAC CE and/or a DCI.

In examples, a WTRU may be configured with (e.g., via configuration information) multiple TCI state groups (e.g., via an RRC). A WTRU may receive one or more indications activating a first one or more TCI state groups of the multiple TCI state groups, e.g., based on the multiple TCI state groups. A WTRU may receive one or more indications of a second one or more TCI state groups of the first one or more TCI state groups (e.g., via one or more DCI fields), e.g., based on the first one or more TCI state groups. In examples, based on the indications, a WTRU may determine the second one or more TCI state groups, for example, for one or more of the following: receiving one or more PDSCH transmissions, transmitting one or more PUSCH transmissions, and/or transmitting one or more PUCCH transmissions.

A DCI may be one or more of the following: WTRU specific DCI, group DCI, uplink DCI, downlink DCI, or the like.

FIG. 4 illustrates an example of a TCI state group indication. In examples, a WTRU may determine one or more TCI state groups for processing, transmitting, or receiving channels and/or signals (e.g., based on an indication in MAC-CE) and one or more TCI states for the channels and/or signals, which may be indicated in DCI. For example, a WTRU may be configured with (e.g., via configuration information) one or more TCI state groups (e.g., via an RRC). The WTRU may be indicated (e.g., receive an indication, such as via a MAC-CE) with a subset of TCI state groups, e.g., to use for channels and/or signals. The WTRU may receive one or more TCI states within the determined TCI state group (e.g., in a DCI), for example, for transmitting or receiving channels and/or signals.

A WTRU may report a preferred TCI state group. A WTRU may be configured with (e.g., via configuration information) one or more TCI state groups. A TCI state group (e.g., each of the one or more TCI state groups) may include a set of TCI states. A WTRU may report a preferred TCI state group to a base station (e.g., a gNB).

In examples, a preferred TCI state group may be determined, for example, based on a measurement quality (e.g., L1-RSRP or L1-SINR) of TCI states in the TCI state group. For example, a WTRU may measure beam quality of one or more TCI states in a TCI state group (e.g., each TCI state group) and report a TCI state group index, which may have a higher measurement quality. A measurement quality may be based on, for example, one or more of the following: a best TCI state (e.g., a TCI state that has a highest measurement quality), a worst TCI state (e.g., a TCI state that has lowest measurement quality), best N TCI states, worst N TCI states, or an average of measurement quality of TCI states in the TCI state group. A TCI state group may have a smaller maximum power reduction (e.g., due to MPE-SAR)

A preferred TCI state group may be reported (e.g., via a MAC-CE), for example, if (e.g., when) a WTRU reports power headroom, a maximum power reduction value, etc. (e.g., due to MPE-SAR). In examples, a WTRU may report a preferred TCI state group, for example, if (e.g., when) a maximum power reduction value is higher (or lower) than a threshold. A preferred TCI state group may be reported or indicated, for example, if (e.g., when) one or more TCI state groups satisfy one or more predefined conditions. A condition may include at least one of the following: a beam quality of one or more states in a TCI state group; a maximum power reduction level associated with one or more TCI states in a TCI state group; a power headroom level associated with one or more TCI states in a TCI state group; or the like.

A WTRU may determine one or more aspects for one or more TCI state groups based on a CSI reporting based indication. TCI state group switching may use CSI-related quantities reported by a WTRU, such as a layer L1-RSRP, or SINR at a base station (e.g., a gNB). TCI state group switching may be based on one or more of following: absolute RSRP/SINR/CQI and/or differential RSRP/SINR/CQI values of a reference signal of TCI states (e.g., referred to as RSRP/SINR/CQI of the TCI state); absolute RSRP/SINR/CQI and/or differential RSRP/SINR/CQI values of a reference signal of CSI configurations. CSI reporting may be based on one or more of following. A WTRU may report one or more of M TCI state Indexes, CRIs and SSBRIs, for example, in a CSI report (e.g., to indicate best/worst M TCI states or worst M TCI states). The best M TCI states or the worst M TCI states may be determined, for example, based on one or more of following: L1-RSRP; L1-SINR; CQI;RI; PMI; or the like. A WTRU may report an absolute value for the best/worst TCI state/CRI/SSBRI and differential values for M-1 TCI states/CRIs/SSBRIs.

RSRP/SINR/CQI of the TCI state may be used interchangeably with one or more of following: absolute RSRP/SINR/CQI and/or the differential RSRP/SINR/CQI values of the reference signal of the TCI states; absolute RSRP/SINR/CQI and/or the differential RSRP/SINR/CQI values of the reference signal of CSI configurations; or the like.

TCI group switching may be based on an absolute RSRP/SINR. A comparison may be made with RSRP/SINR/CQI of the TCI state, which may correspond to a highest RSRP/SINR/CQI from a TCI state group (e.g., each TCI state group). A TCI state group with (e.g., including) a TCI state with a highest RSRP/SINR/CQI may be selected (e.g., for activation).

In an example, an average RSRP/SINR/CQI of a subset of N TCI states out of TCI states (e.g., all the M TCI states) in a group may be considered (e.g., for comparison), wherein a value of N relative to M may be given by (1≤N≤M). A subset may be selected, for example, arbitrarily or based on parameters. In an example, N=M may be a special case of considering an average RSRP/SINR/CQI of multiple TCI states (e.g., all the TCI states). Parameter based selection of a subset of TCI states from a TCI state group (e.g., each TCI state group) may be performed, for example, based on one of two following methods. In an example (e.g., a first example), a first N (1≤N<M) out of descending ordered M TCI states based on RSRP/SINR/CQI may be selected. A TCI state group corresponding to a highest average RSRP/SINR/CQI may be activated for transmission and/or reception. In an example (e.g., a second example), a first N (1≤N <M) out of ascending ordered M TCI states based on RSRP/SINR/CQI may be selected. A TCI state group corresponding to a highest average RSRP/SINR/CQI may be activated for transmission and/or reception.

TCI state group switching may be based on differential RSRP/SINR/CQI values. TCI state group switching may be based on differential power management maximum power reduction (PMPR) values. Differential RSRP/SINR/CQI may be used to identify a change in P-MPR. A differential RSRP/SINR/CQI of TCI groups may be tested against a predetermined threshold value. A threshold value may be updated (e.g., regularly), for example, based on one or more parameters, e.g., including a frequency of TCI state group switching that may occur in a certain time window and parameters related to a distribution of RSRP/SINR/CQI of different TCI states. For calculation of a differential RSRP/SINR/CQI of the TCI state groups, a TCI state group (e.g., each TCI state group) may be represented by a parameter (e.g., a single parameter). A parameter may be based on a highest RSRP/SINR/CQI of the TCI states in a TCI state group (e.g., each TCI state group). A parameter may be based on an average RSRP/SINR/CQI of multiple TCI states (e.g., a subset of or all TCI states) in a TCI state group (e.g., each TCI state group). A subset of TCI states may be selected, for example, randomly or based on certain parameter(s). A parameter-based subset of TCI states selection may be based on a selection of the first N ($1 \leq N < M$) out of descending ordered M TCI states (e.g., based on RSRP/SINR associated with the M TCI states). In examples, M may be the total number of TCI states in the TCI state group. A parameter-based subset of TCI states selection may be based on a selection of the first N ($1 \leq N < M$) out of ascending ordered M TCI states (e.g., based on RSRP/SINR associated with the M TCI states).

Figure 5:
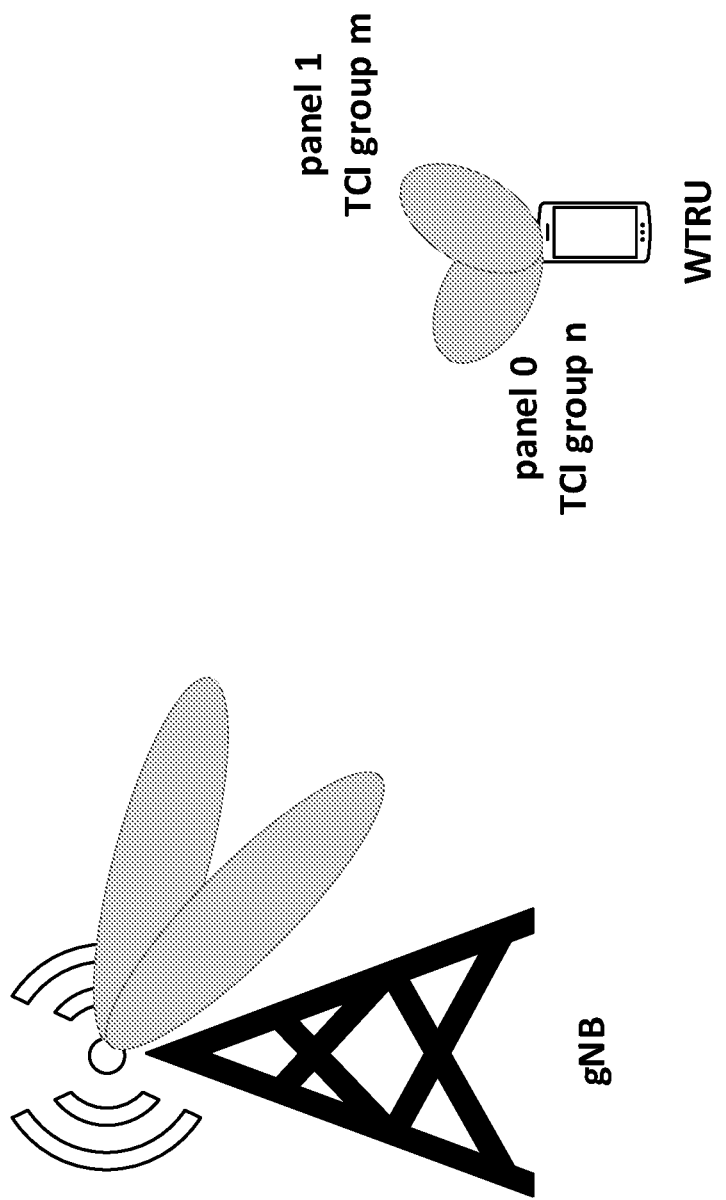
FIG. 5 illustrates an example of panel-based TCI group activation in a single-transmission/reception point (TRP) network.
Figure 6:
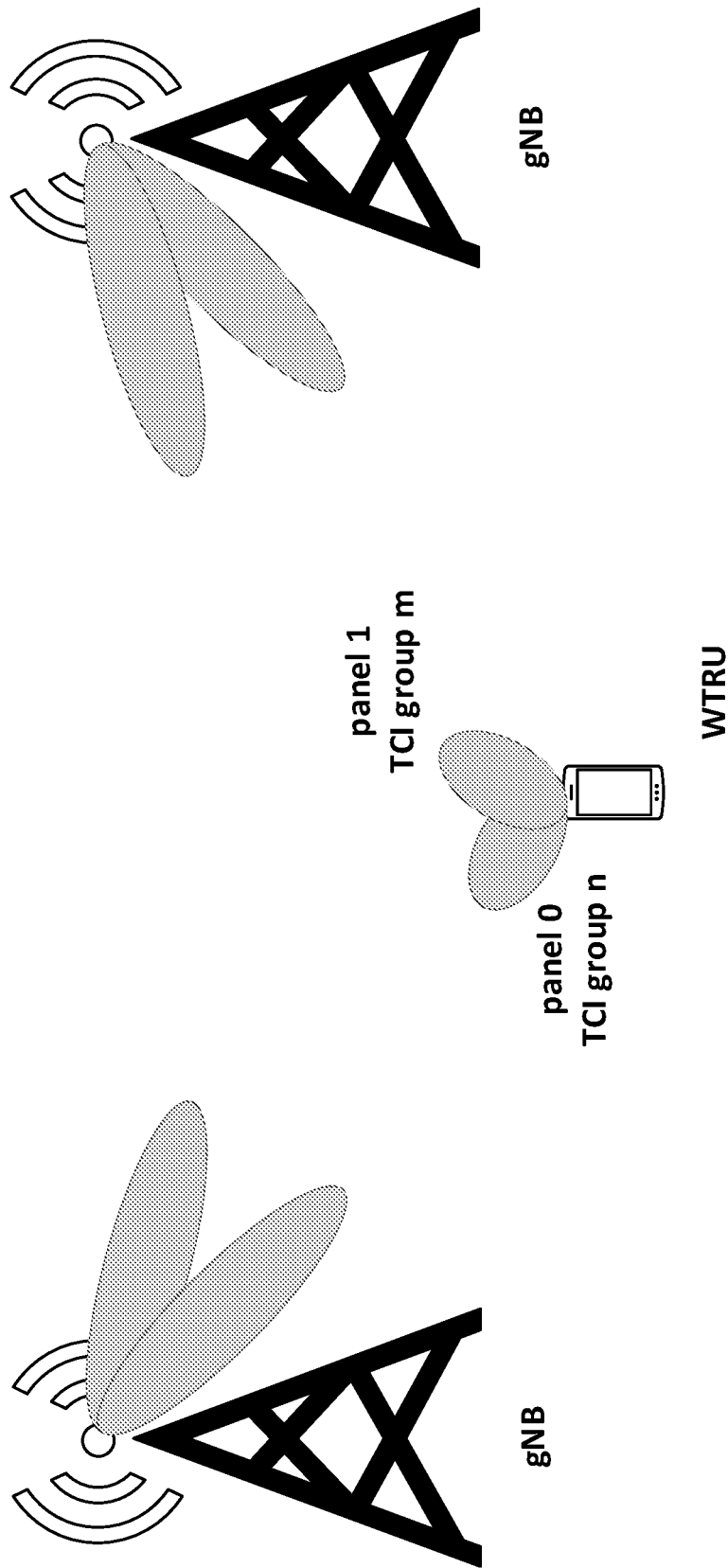
FIG. 6 illustrates an example of beam and antenna panel-based TCI group activation in a multi-TRP network.
Figure 7:
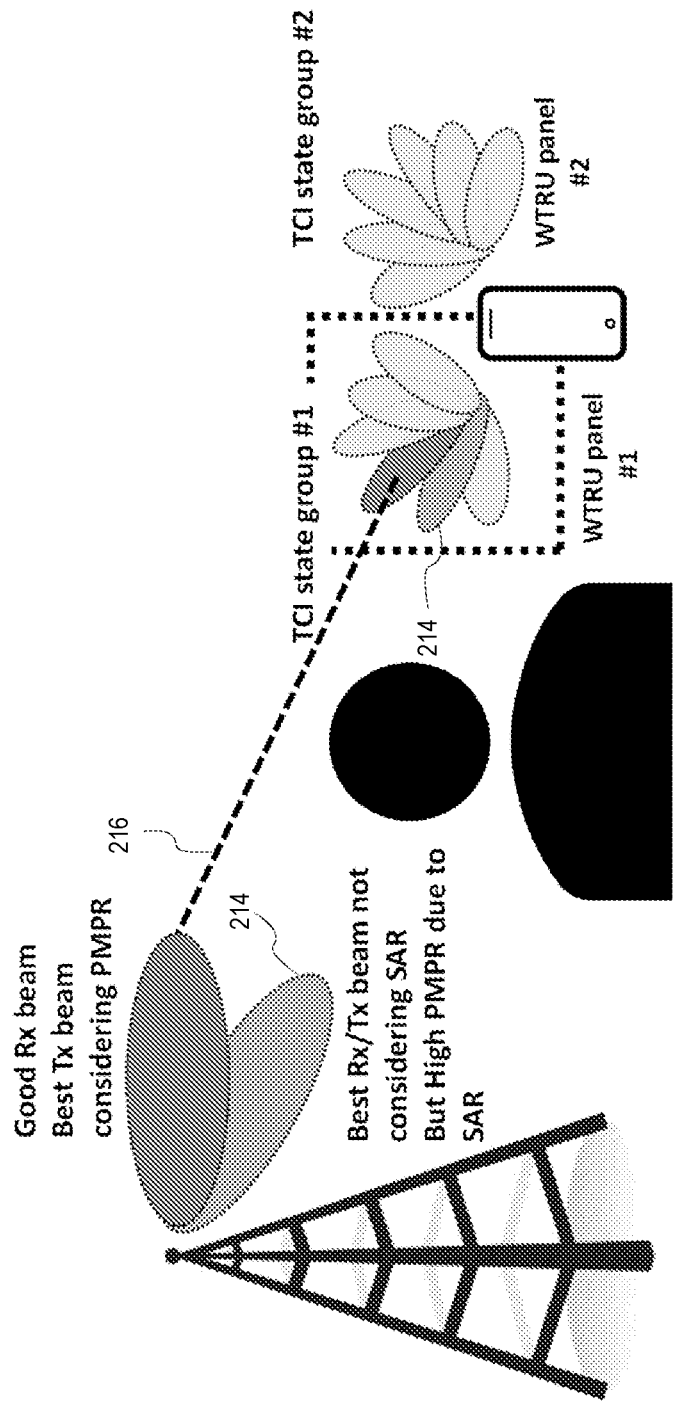
FIG. 7 illustrates an example of TCI state group switching based on measured power management maximum power reduction (PMPR).

FIG. 5 illustrates an example of panel-based TCI group activation in a single-TRP network. FIG. 6 illustrates an example of beam and antenna panel-based TCI group activation in a multi-TRP network. FIG. 7 illustrates an example of TCI state group switching based on measured PMPR.

WTRU power saving based on TCI state group switching may include fast antenna panel switching and/or disabling of a WTRU antenna panel. Different TCI state groups may be associated with different antenna panels in a multi-panel WTRU (e.g., as shown by example in FIG. 6). TCI state group switching may be indicated to a WTRU, for example, using several approach(es), for example, if (e.g., when) TCI state group switching is triggered by a base station (e.g., a gNB), e.g., as described herein. For example, fast WTRU antennal panel switching may be triggered by a MAC-CE or a DCI based indication or an indication (e.g., an implicit indication) by a base station (e.g., a gNB). A WTRU may disable an antenna panel associated with (e.g., assigned to or that belongs to) a unconfigured TCI state group. An antenna panel (e.g., antenna panel associated with an unconfigured TCI state group) may be disabled for a specific duration, for example, to save WTRU power and reduce signaling overhead. In an example, a WTRU may disable an antenna panel based on a time duration (e.g., a timer). A time duration (e.g., a timer) may be picked out of a series of values defined and communicated to the WTRU by the network. In an example, a WTRU may compute a time duration value (e.g., a timer value), for example, based on pre-determined parameters by the network and/or measurements performed at the WTRU.

In an example (e.g., to save WTRU power and reduce signaling overhead), a linkage may be defined/configured, for example, between a TCI state (e.g., an individual TCI state), an index of active CORESET or similar parameters, and a WTRU antenna panel. A change in TCI state switching or an active CORESET may be used to indicate antenna panel switching at the WTRU. An inactive antenna may be disabled (e.g., as described herein), for example, to save WTRU power and reduce signaling overhead.

There may be a default TCI state group. A default TCI state may be determined. A WTRU and/or a base station (e.g., a gNB) may determine one or more default TCI state groups, for example, before gNB and/or WTRU indications/confirmations. In example, a default TCI state group may be one or more of the following: a first configured TCI state group; a TCI state group with a lowest/highest TCI state group ID; a TCI state group associated with a CORESET with a lowest/highest CORESET ID; a TCI state group associated with a resource with a lowest/highest resource ID; or the like. A resource may be one or more of the following: an SSB; a CSI-RS resource/resource set; an SRS resource/resource set; a PUCCH resource (e.g., for HARQ ACK/NACK reporting and/or scheduling requests); or the like.

TCI states may be determined from a TCI state group.

An RS may correspond to a TCI state. The RS may be a DL RS or an UL RS. A WTRU may measure the RS. In examples, the WTRU may measure a DL RS. The measurement may be an RSRP and/or L1-RSRP measurement.

A power management maximum power reduction (PMPR) (e.g., a PMPR value) may be a power backoff (e.g., a power backoff value) that a WTRU may determine to use or apply, for example, for a transmission or when transmitting (e.g., in an UL).

The WTRU may determine a PMPR for an RS. The PMPR for an RS may be a PMPR for a transmission based on the RS, for example, using a beam corresponding to the RS or a TCI state corresponding to the RS. A DL RS may be used to determine an UL beam or spatial filter.

A WTRU may determine a PMPR (e.g., to use or apply for a transmission in an UL) for a DL RS. The DL RS may be associated with a TCI state. The UL beam, direction, TCI state, or spatial filter for which the PMPR is determined may correspond to the DL RS or may be determined by the WRTU from the DL RS, for example, by using reciprocity or an association/linkage that may be configured (e.g., in the WTRU) and/or indicated (e.g., to the WTRU).

The WTRU may measure and/or determine a measurement for an RS, such as a DL RS. The measurement may be an RSRP or L1-RSRP measurement. The WTRU may determine a PMPR value for the RS. The WTRU may adjust (e.g., reduce or decrease) the RS measurement based on the determined PMPR value. The WTRU may report at least one of the RS measurement, the determined PMPR for the RS, or the adjusted RS measurement, e.g., to a base station (e.g., a gNB). For example, the WTRU may report the determined PMPR value and/or the determined L1-RSRP value.

For an RS (e.g., each of one or more RSes), the WRTU may determine and/or report at least one of a RS measurement (e.g., a respective RS measurement), a determined PMPR value for the RS (e.g., a respective determined PMPR for the RS), or an adjusted RS measurement (e.g., a respective adjusted RS measurement. The RS may be associated with a TCI state.

A WTRU may determine one or more TCI states of a determined one or more TCI state groups based on, for example, one or more of following: a DCI based indication, a MAC CE based indication, an RRC, based indication, a WTRU centric indication, a default TCI, and/or the like.

A WTRU may determine one or more TCI states of a determined one or more TCI state groups, for example, based on a DCI based indication. A WTRU may receive one or more indications indicating one or more TCI states of the determined one or more TCI state groups. For example, a WTRU may be configured with (e.g., via configuration information) first multiple TCI states associated with a first TCI state group and second multiple TCI states associated with a second TCI state group. A TCI state indication field in the DCI may indicate one or more TCI states of the first multiple TCI states, for example, if the WTRU determines the first TCI state group. A TCI state indication field in DCI may indicate one or more TCI states of the second multiple TCI states, for example, if the WTRU determines the second TCI state group. A size of an indication field may be based on one or more of the following: a number of configured TCI states in the determined TCI state group; a maximum number of configured TCI states in one or more configured TCI state groups (e.g., all configured TCI state groups); or the like. Redundant bit(s) may be padded, for example, with specific bit(s) (e.g., '0's or '1's).

A WTRU may determine one or more TCI states of a determined one or more TCI state groups, for example, based on a MAC CE based indication. A WTRU may receive one or more of indications indicating one or more TCI states of the determined one or more TCI state groups. For example, a WTRU may be configured with (e.g., via configuration information) first multiple TCI states associated with a first TCI state group and second multiple TCI states associated with a second TCI state group. A TCI state indication field in a MAC CE may indicate one or more TCI states of the first multiple TCI states, for example, if the WTRU determines the first TCI state group. A TCI state indication field in a MAC CE may indicate one or more TCI states of the second multiple TCI states, for example, if the WTRU determines the second TCI state group. A size of an indication field may be based on, for example, one or more of the following: a number of configured TCI states in the determined TCI state group; a maximum number of configured TCI states in one or more configured TCI state groups (e.g., all configured TCI state groups); or the like. Redundant bit(s) may be padded, for example, with specific bit(s) (e.g., '0's or '1's).

A WTRU may determine one or more TCI states of a determined one or more TCI state groups, for example, based on an RRC based indication. A WTRU may receive one or more indications indicating one or more TCI states of the determined one or more TCI state groups. For example, a WTRU may be configured with (e.g., via configuration information) first multiple TCI states associated with a first TCI state group and second multiple TCI states associated with a second TCI state group. In examples, based on the configuration, a WTRU may be configured with (e.g., via configuration information) first one or more TCI states of the first multiple TCI states and second one or more TCI states of the second multiple TCI states for resource(s) (e.g., CORESET(s), PDSCH resource(s), PUCCH resource(s), PUSCH resource(s), CSI-RS resource(s), CSI-RS resource set(s), SRS resource(s), SRS resource set(s), PRACH resource(s), etc.) and/or usage. A WTRU may determine one or more TCI states, e.g., based on the determined TCI state group. A WTRU may determine the first one or more TCI states for receiving/transmitting channel transmission(s) and/or signal(s), for example, if the WTRU determines the first TCI state group. A WTRU may determine the second one or more TCI states for receiving/transmitting channel transmissions and/or signal(s), for example, if the WTRU determines the second TCI state group.

A WTRU may determine one or more TCI states of a determined one or more TCI state groups, for example, based on a WTRU centric indication.

A WTRU may transmit one or more RRC messages. For example, a WTRU may indicate a preferred TCI state in a determined TCI state group, e.g., via one or more RRC messages.

A WTRU may transmit one or more MAC CE messages. For example, a WTRU may indicate a preferred TCI state in a determined TCI state group, e.g., via one or more RRC messages. For example, a WTRU may indicate preferred a TCI state by using MAC CE message(s) (e.g., PHR reporting) comprising an MPE and/or a SAR indication. In an example, an MPE and/or SAR indication may comprise P-MPR value(s) on one or more RS resources/resource sets and/or TCI states/state groups. In examples, the one or more RS resources/resource sets and/or TCI states/state groups may be one or more of following: a CSI-RS resource; a CSI-RS resource set; an SSB; an SRS resource; an SRS resource set; or the like. The P-MPR value(s) may be based on absolute value(s) and/or differential value(s). For example, a WTRU may report one or more of the following: absolute value(s) for M RS resource(s)/resource set(s) and/or TCI state(s)/state group(s); absolute value(s) for M RS resource(s)/resource set(s) and/or TCI state(s)/state group(s); an absolute value(s) for best/worst RS resource(s)/resource set(s) and/or TCI state(s)/state group(s) and differential value(s) for M-1 RS resource(s)/resource set(s) and/or TCI state(s)/state group(s); or the like.

A WTRU may transmit one or more uplink signals/channel transmissions. For example, a WTRU may be configured with (e.g., via configuration information) one or more uplink resources (e.g., PUCCH/PUSCH resource(s) for HARQ ACK/NACK, scheduling request(s), SRS resource set(s), PRACH resource(s), etc.). The one or more uplink resources (e.g., each of the one or more uplink resources) may be associated with one or more TCI states of the determined TCI state group. A WTRU may indicate the one or more TCI states associated with the determined TCI state group, e.g., based on the configuration. For example, a WTRU may be configured with (e.g., via configuration information) a first uplink resource associated with a first TCI state, and second uplink resources associated with a second TCI state. The WTRU and the base station (e.g., the gNB) may determine the first TCI state, for example, if the WTRU transmits uplink channel transmissions/signals in the first uplink resource. The WTRU and the gNB may determine the second TCI state, for example, if the WTRU transmits uplink channel transmissions/signals in the second uplink resource.

A WTRU may transmit one or more CSI reports. A WTRU may indicate a preferred resource that may be associated with the determined TCI state group, for example, based on CSI report(s) (e.g., via a PUCCH transmission and/or a PUSCH transmission). For example, a WTRU may indicate preferred resource(s) and quality/qualities of the resource(s). A WTRU and a base station (e.g., a gNB) may determine a TCI state (e.g., a TCI state associated with a selected resource) of the determined TCI state group, for example, based on an order of an indication (e.g., a first reported resource) and/or one or more qualities (e.g., a resource with a best quality). In examples, resources may be one or more of the following: a CSI-RS resource/resource set; an SRS resource/resource set; a TCI state; or the like. In examples, quality may be one or more of the following: a CQI; an L1-RSRP; an L1-SINR; or the like.

A WTRU may combine multiple reportings for a determination. A WTRU may determine a TCI state of a determined TCI state group, for example, based on WTRU's P-MPR reporting and CSI reporting. For example, a WTRU may consider a reported quality and P-MPR for a determination of a TCI state. In examples, the WTRU may consider and/or apply one or more of following : a CQI assuming P-MPR (e.g., selected CQI considering SINR and P-MPR); L1-RSRP and P-MPR (e.g., L1-RSRP-P-MPR); L1-SINR and P-MPR (e.g., L1-SINR-P-MPR); or the like.

A WTRU centric indication may use confirmation(s) from a base station (e.g., a gNB). A WTRU may receive one or more confirmations, for example, based on one or more CORESETs. The CORESETs may include one or more of the following: a confirmation CORESET for TCI state determination; or one or more confirmation CORESETs associated with one or more TCI states. For example, a first CORESET may be associated with a first TCI state and a second CORESET may be associated with a second TCI state. A WTRU may receive a confirmation PDCCH transmission in the first CORESET, for example, if the WTRU reports the first TCI state. A WTRU may receive a confirmation PDCCH transmission in the second CORESET, for example, if the WTRU reports the second TCI state. A WTRU may receive one or more confirmations, for example, based on a DCI field. A DCI field may indicate a confirmation, for example, based on an explicit indication (e.g., 0 for no confirmation and 1 for a confirmation), toggling (e.g., changing a DCI field value from 0 to 1 when the gNB receives an WTRU indication); and/or the like. A WTRU may apply a determined TCI state, for example, in response to (e.g., after) receiving a confirmation from a gNB.

A default TCI state determination may be used. A WTRU and/or a base station (e.g., a gNB) may determine one or more default TCI states of a determined TCI state group, for example, without (e.g., before) base station (e.g., gNB) and/or WTRU indications/confirmations. In examples, default TCI states may be one or more of the following: a first TCI state of the determined TCI state group; a TCI state with a lowest/highest TCI state ID of the determined TCI state group; a TCI state associated with a CORESET with a lowest/highest CORESET ID of the determined TCI state group; a TCI state associated with a resource with a lowest/highest resource ID of the determined TCI state group; or the like. In examples, a resource may be one or more of the following: an SSB; a CSI-RS resource/resource set; an SRS resource/resource set; a PUCCH resource (e.g., for HARQ ACK/NACK reporting and/or scheduling requests); or the like.

Figure 8:
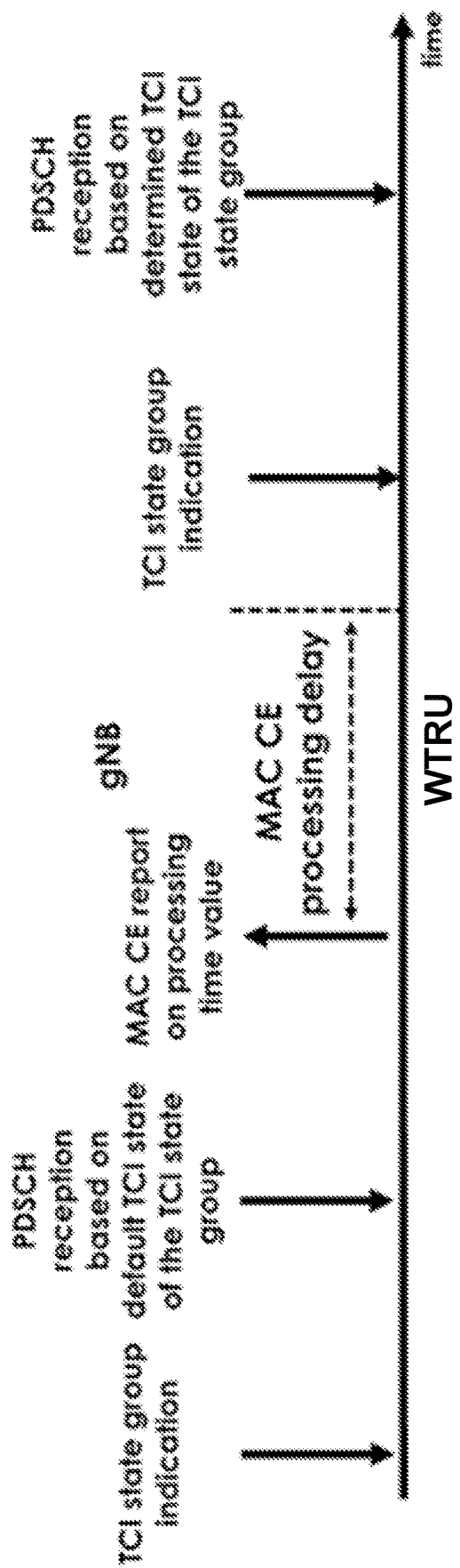
FIG. 8 illustrates an example of operation of a TCI state determination.
Figure 9:
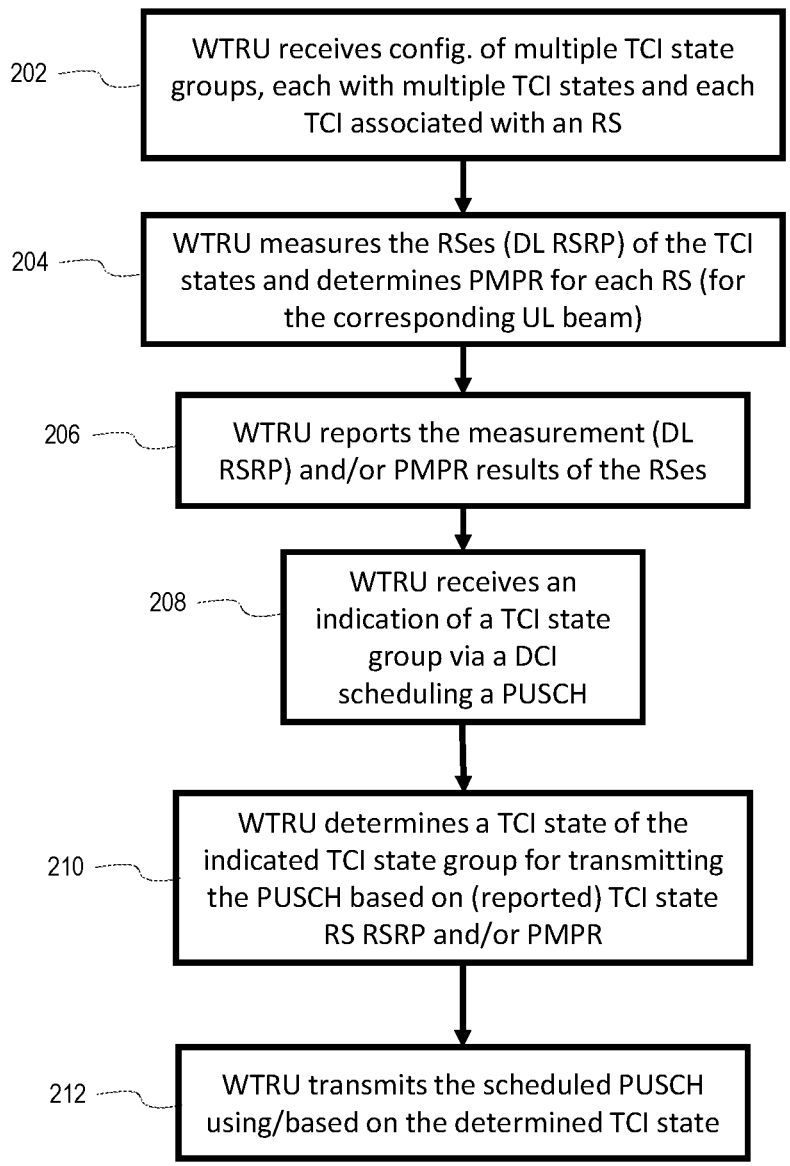
FIG. 9 illustrates an example flow chart for TCI state determination with an indicated TCI state group.
Figure 10:
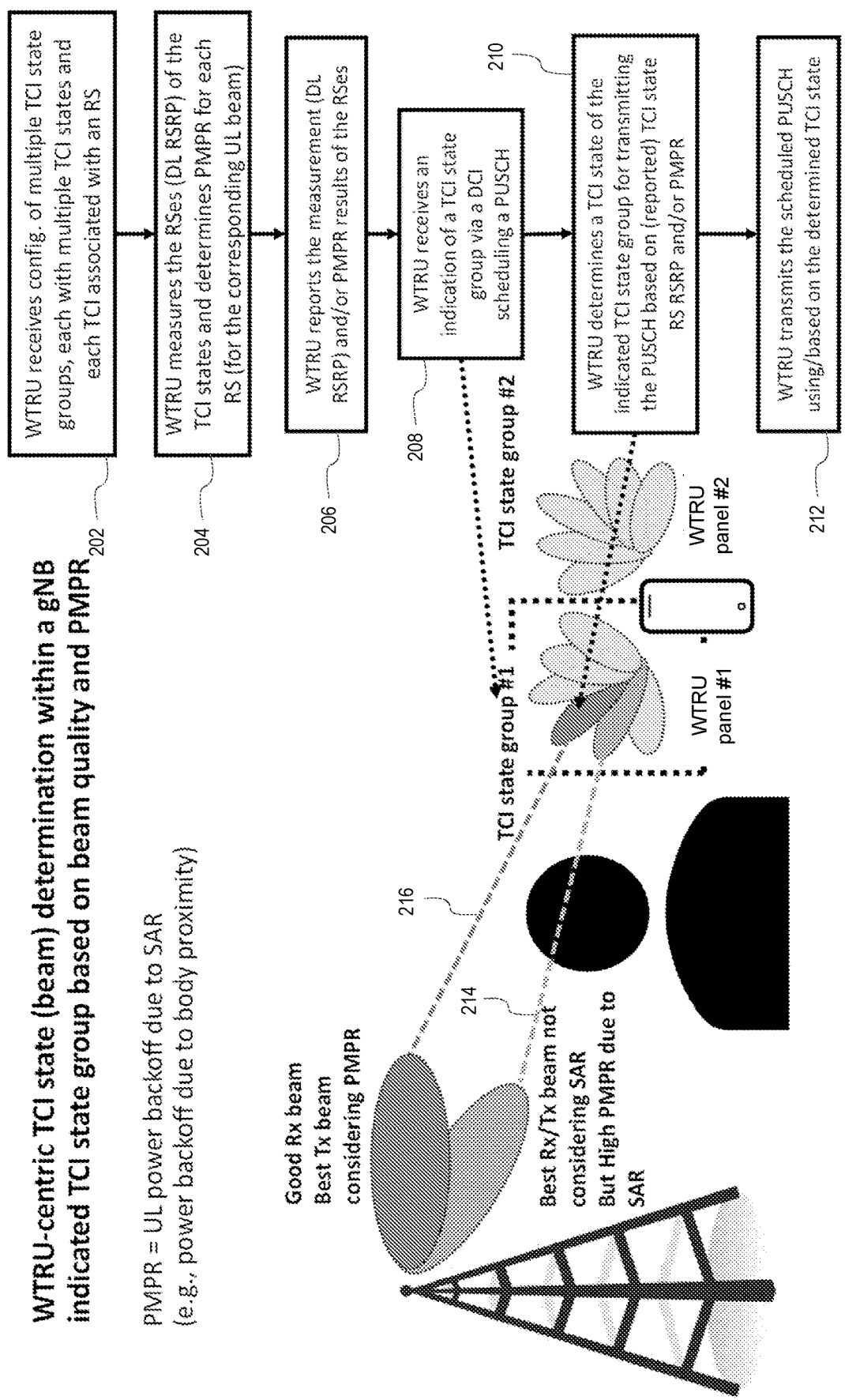
FIG. 10 illustrates WTRU-centric TCI state (beam) determination within a gNB indicated TCI state group based on beam quality and PMPR.

FIG. 8 illustrates an example of operation of a TCI state determination. FIG. 9 illustrates an example flow chart for TCI state determination with an indicated TCI state group. FIG. 10 illustrates WTRU-centric TCI state (beam) determination within a gNB indicated TCI state group based on beam quality and PMPR.

A TCI state determination (e.g., based on an indicated TCI state group) may be performed in a WTRU, e.g., using one or more of the following features. The WTRU may receive configuration(s) of one or more TCI state groups (e.g., see 202 in FIGS. 9 and 10). At least one of the one or more TCI state groups (e.g., each of the one or more TCI state groups) may include one or more TCI states (e.g., see 202 in FIGS. 9 and 10). At least one of the one or more TCI states (e.g., each of the one or more TCI states) may be associated with one or more RSes (e.g., see 202 in FIGS. 9 and 10). The WTRU may measure the RS(es) (e.g., a DL RSRP) associated with the at least one of the one or more TCI states (e.g., each of the one or more TCI states) of the one or more TCI state groups (e.g., see 204 in FIGS. 9 and 10). The WTRU may determine a PMPR value for each RS (e.g., for a corresponding UL beam) or each of the one or more TCI state groups (e.g., see 206 in FIGS. 9 and 10). The WTRU may report the RS measurement(s) and the determined PMPR value(s) (e.g., for each RS or each of the one or more TCI state groups). The WTRU may receive an indication of one or more TCI state groups, e.g., via a DCI scheduling a PUSCH (e.g., see 208 in FIGS. 9 and 10, wherein the one or more indicated TCI state groups may be TCI state group #1). The WTRU may determine a TCI state of the one or more indicated TCI state groups, e.g., based on the measurement(s) (e.g., the reported measurement(s)) and/or determined PMPR values(s) for the RS value(s) associated with the one or more TCI states of the one or more indicated TCI state groups (e.g., see 210 in FIGS. 9 and 10, wherein the determined TCI state may be TCI state 216). The WTRU may transmit a scheduled PUSCH based on (e.g., using) the determined TCI state (e.g., see 212 in FIGS. 9 and 10).

As shown in FIG. 10 (also shown in FIG. 7), a first transmission/reception beam/TCI state (see beam/TCI state 214) may be a best beam/TCI state if a first PMPR value is not determined (e.g., for an RS associated with the first transmission/reception beam/TCI state). If determined, the first PMPR value may be high due to SAR. A second beam/TCI (see beam/TCI state 216) may be a best transmission/reception beam/TCI state if a second PMPR value is determined (e.g., for an RS associated with the second beam/TCI). The second determined PMPR value may be lower than the first determined PMPR value.

A WTRU may determine a measurement type and/or reporting type (e.g., based on RS measurements associated with one or more configured TCI state groups or an indicated TCI state group). The WTRU may receive an indication of the measurement type and/or reporting type (e.g., via MAC CE and/or DCI).

TCI states may be jointly indicated, e.g., for multiple channels, signals and/or links. A TCI indication may be performed jointly, e.g., for uplink and downlink transmissions. In a joint indication of TCI, a WTRU may be configured with (e.g., via configuration information) one or more reference signals. A WTRU may determine spatial filtering required for transmission or reception of a signal (e.g., uplink and/or downlink), e.g., based on the one or more reference signals.

A WTRU may determine a mode of operation for use by the WTRU. The WTRU may determine one of a first mode of operation (e.g., a separate TCI state indication and/or determination for each link, channel and/or signal) or a second mode of operation (e.g., a joint TCI state indication for a set of one or more links, channels and/or signals). In the first mode of operation, the WTRU may receive a dedicated TCI state indication and may determine one or more TCI states for each link, each channel and/or each signal. In the second mode of operation, the WTRU may receive a joint TCI state indication and may determine one or more TCI states for a set of one or more links, one or more channels and/or one or more signals. The set of one or more links, channels, and/or signals for a TCI state indication may be one or more of the following: one or more links (e.g., a downlink, a uplink and/or a sidelink); one or more channels (e.g., a control channel, a shared channel, a random access channel, a broadcast channel and/or the like); one or more signals (e.g., a CSI-RS, a S RS, a DM-RS, a TRS, a SSB, a positioning RS (PRS) and/or the like); or one or more cells (e.g., multiple serving cells and/or cells other than serving cells for inter-cell operation).

The modes of operation may be determined, for example, based on one or more of the following: a configuration of a joint TCI state; a configuration of CORESETs and/or search spaces for a joint TCI state indication; a configuration of a TCI state group for a joint TCI state indication; a WTRU capability and/or gNB configuration, e.g., based on the WTRU capability reporting; a frequency range; a preferred mode of operation requested by a WTRU; a reliability of a link; or a value of configured CORESETPoolIndex in the ControlResourceSet (e.g., if CORESETPoolIndex is configured).

A mode of operation may be determined based on a configuration of a joint TCI state. If a WTRU is configured with (e.g., via configuration information) a separate TCI state (e.g., a DL TCI and/or a UL TCI) or the WTRU is not configured with (e.g., via configuration information) a joint TCI state (e.g., a TCI state for DL and UL), the WTRU may determine the first mode of operation. If a WTRU is configured with (e.g., via configuration information) a joint TCI state, the WTRU may determine the second mode of operation.

A mode of operation may be determined based on a configuration of CORESETs and/or search spaces for a joint TCI state indication. If a WTRU is not configured with (e.g., via configuration information) one or more CORESETs and/or search spaces for a joint TCI state indication (e.g., a TCI state for DL and UL), the WTRU may determine the first mode of operation. If a WTRU is configured with (e.g., via configuration information) the one or more CORESETs and/or search spaces for a joint TCI state indication, the WTRU may determine the second mode of operation.

A mode of operation may be determined based on a configuration of a TCI state group for a joint TCI state indication. If a WTRU is not configured with (e.g., via configuration information) one or more TCI state groups for a joint TCI state indication (e.g., a TCI state for DL and UL), the WTRU may determine the first mode of operation. If a WTRU is configured with (e.g., via configuration information) one or more TCI state groups for a joint TCI state indication, the WTRU may determine the second mode of operation. The one or more TCI state groups may include one or more of the following: one or more links (e.g., a downlink, a uplink and/or a sidelink); one or more channels (e.g., a control channel, a shared channel, a random access channel, a broadcast channel and/or the like); one or more signals (e.g., a CSI-RS, a S RS, a DM-RS, a TRS, a SSB, a positioning RS (PRS) and/or the like); or one or more cells (e.g., multiple serving cells and/or cells other than serving cells for inter-cell operation). The joint TCI state indication and/or determination may be per TCI state group of the configured and/or indicated one or more TCI state groups.

A mode of operation may be determined based on a WTRU capability and/or a base station configuration (e.g., a gNB configuration), e.g., based on a WTRU capability reporting.

A mode of operation may be implicitly determined based on a frequency range. A first mode of operation may be used in a first frequency range (e.g., FR2) and a second mode of operation may be used in a second frequency range (e.g., FR3). For example, a mode of operation may be configured for a first frequency range (e.g., FR2) and a mode of operation (e.g., second mode of operation) may be pre-determined for a second frequency range (e.g., FR3)

A WTRU may request a preferred mode of operation for a joint TCI state indication. If the WTRU is capable to support both modes of operation (e.g., a first mode and a second mode) and measurements at the WTRU indicate a preferred mode of operation (e.g., a similar measured quality trend for multiple links, channels, signals and/or cells), the WTRU may indicate to a base station (e.g., a gNB) the preferred mode of operation.

A mode of operation may be determined based on reliability of a link. A WTRU may be configured with (e.g., via configuration information) separate and joint TCI indication configurations where one mode may be preferred for a normal mode of operation, wherein the other mode may be used as a fall back mode. For example, a joint TCI indication may be used for the normal mode of operation, and a separate TCI indication may be used for the fallback mode. If the WTRU determines a poor state of connectivity, the WTRU may use the fallback mode of operation, and may use one or more of separate TCI indication configurations.

A mode of operation may be determined based on a value of configured CORESETPool Index in the ControlResourceSet (e.g., if CORESETPoolIndex is configured). A WTRU may be configured to use one mode of TCI indication for a link corresponding to CORESETPoolIndex=0, and another mode of TCI indication for a link corresponding to CORESETPoolIndex=1. For example, a WTRU may determine a separate TCI indication as the preferred mode of TCI operation for the link corresponding to CORESETPoolIndex=0. The WTRU may determine a joint TCI indication as the preferred mode of TCI indication for the link corresponding to CORESETPoolIndex=1.

A WTRU may determine a joint TCI state indication, for example, based on one or more of the following: an RRC configuration, a MAC CE, or a DCI.

A WTRU may determine a joint TCI state indication based on an RRC configuration. An RRC configured one or more TCI states may be used for a joint TCI state indication.

A WTRU may determine a joint TCI state indication based on a MAC CE. A WTRU may receive an indication of one or more joint TCI states via a MAC CE. The MAC CE may indicate one or more of the following: a logical channel ID (LCID) for a joint TCI state indication; a group ID for a joint TCI state indication; a cell ID and/or a serving cell ID; or a joint TCI state ID.

A WTRU may determine a joint TCI state indication based on a DCI, such as a WTRU specific DCI or a group DCI.

A joint TCI state indication based on a WTRU specific DCI may be determined, e.g., in a DCI that schedules for one or more shared channels. The WTRU specific DCI received in the DCI scheduling shared channels may be in DCI format(s), e.g., DCI formats 0-0, 0-1, 0-2, 1-0, 1-1, 1-2 or the like. A WTRU may receive an indication of one or more joint TCI states via a DCI scheduling PDSCH. The WTRU may determine a TCI state based on the PDSCH scheduling. If the DCI schedules a PDSCH with a TCI state indication, the WTRU may determine the indicated TCI state. If the DCI does not schedule a PDSCH (e.g., any PDSCH) with a TCI state indication, the WTRU may use a TCI state that was previously indicated and determined.

A joint TCI state indication based on a WTRU specific DCI may be received, e.g., in a dedicated DCI for a joint TCI state indication.

A joint TCI state indication may be based on a group DCI. For example, a joint TCI state indication may be based on a dedicated group DCI for a joint TCI state indication.

A WTRU may be configured by a RRC with more than one configuration for a joint TCI state indication. In each RRC configuration a different set of reference signals and/or QCL assumptions may be considered. A WTRU may receive an indication (e.g., via a MAC CE) to activate a subset of the RRC configured joint TCI state configurations. The WTRU may receive an indication of a joint TCI state configuration (e.g., via a DCI) among the activated subset of the RRC configured joint TCI state configurations (e.g., on the condition of having activated the subset of the RRC configured joint TCI state configurations). A WTRU may receive (e.g., only receive) a MAC CE or a DCI to select a joint TCI state indication configuration from the RRC configured joint TCI state indication configurations.

A WTRU may be configured by RRC with more than one configuration for TCI state indications. Each configuration may include a pair of separate and joint TCI state indications. Each configuration may use a different set of reference signals and/or QCL assumptions. A WTRU may be indicated (e.g., via a MAC CE) to activate a subset of the RRC configured pairs of separate and joint TCI state indications. The WTRU may receive an indication of a pair (e.g., via a DCI) among the activated subset of the RRC configured pairs (e.g., on the condition of having activated the subset of the RRC configured pairs). A WTRU may receive (e.g., only receive) a MAC CE or a DCI to select a pair of separate and joint TCI state indications from the RRC configured pairs of separate and joint TCI state indications.

A WTRU may determine a TCI state based on a first TCI state (e.g., a newly indicated TCI state (e.g., via a DCI and/or a MAC CE)) and a second TCI state (e.g., a previously determined TCI state or the latest TCI state indicated before the first TCI state). For example, validity timing of an indicated TCI state (e.g., a newly indicated TCI state) may be determined based on whether the indicated TCI state is the same as the previously indicated TCI state (e.g., the latest TCI state indicated before the newly indicated TCI state). If the first TCI state is equal to the second TCI state, the WTRU may apply the TCI state for joint TCI state indication. If the first TCI state is not equal to the second TCI state, the WTRU may apply one or more time offsets (e.g., symbols, slots, ms and/or ns).

If the WTRU applies the one or more time offsets, the WTRU may apply the one or more time offsets after time X for the application of the first TCI state. The time X may be one or more of the following: a time (e.g., a slot or a symbol) that the WTRU received the TCI state indication (e.g., via a PDCCH transmission and/or a MAC CE); or the time that the WTRU transmitted ACK/NACK for the PDCCH transmission and/or a PDSCH transmission scheduled by the PDCCH transmission. The one or more time offsets may be determined based on one or more of the following: a number of links for a joint TCI state indication; a number of cells for a joint TCI state indication; a number of channels for a joint TCI state indication; a number of signals for a joint TCI state indication; or a number of signal types (e.g., CSI-RS, SRS, TRS and/or the like) for a joint TCI state indication.

A WTRU may determine a TCI state based on an RS type of a first TCI state. A WTRU may be configured and/or indicated with a first TCI state with a first type RS (e.g., DL RS (e.g., CSI-RS and/or SSB)) and/or a second TCI state with a second type RS (e.g., UL RS (e.g., SRS)). If a WTRU receives an indication of the first TCI state, the WTRU may determine the first TCI state. If a WTRU receives an indication of the second TCI state, the WTRU may apply one or more of following: a default TCI state or a DL RS associated with the second type RS.

If a WTRU receives an indication of the second TCI state, the WTRU may determine a default TCI state. The default TCI state may be predefined, preconfigured or determined based on TCI state ID (e.g., a lowest/highest TCI state ID among the configured TCI states).

If a WTRU receives an indication of the second TCI state, the WTRU may apply a DL RS associated with the second type RS. The WTRU may be configured and/or indicated with the second type RS and the associated DL RS. If the WTRU receives the indication of the second TCI state, the WTRU may determine its spatial filter based on the associated DL RS.

A base station (e.g., a next generation NodeB (gNB)) may provide a confirmation on a WTRU reception of beam indication.

A WTRU may receive a confirmation of WTRU ACK/NACK on a base station indication (e.g., a gNB indication) of one or more TCI states or one or more TCI state groups. The WTRU may determine an application of the one or more TCI states or the one or more TCI state groups, e.g., based on the confirmation. The WTRU may be configured with (e.g., via configuration information) the confirmation, for example, in a first mode of operation. The WTRU may not be configured with (e.g., via configuration information) the confirmation, for example, in a second mode of operation. The WTRU may apply the one or more TCI states or the one or more TCI state groups. If the WTRU is configured with (e.g., via configuration information) the confirmation, the WTRU may apply the one or more TCI states or the one or more TCI state groups after X time duration (e.g., in terms of symbols, slots, or ms) from when (e.g., in terms of a slot or a symbol) the WTRU received the confirmation (e.g., the confirmation from a base station, such as a gNB confirmation). If the WTRU is not configured with (e.g., via configuration information) the confirmation, the WTRU may apply the one or more TCI states or the one or more TCI state groups after Y time duration (e.g., in terms of symbols, slots, or ms) from when (e.g., in terms of a slot or a symbol) the WTRU received a base station indication (e.g., a gNB indication) of the one or more TCI states or the one or more TCI state groups. If the WTRU is not configured with (e.g., via configuration information) the confirmation, the WTRU may apply the one or more TCI states or the one or more TCI state groups after Y time duration (e.g., in terms of symbols, slots, or ms) from when (e.g., in terms of a slot or a symbol) the WTRU sent ACK/NACK on the base station indication (e.g., the gNB indication).

Hereafter, one or more indicated TCI states may be interchangeably used with one or more indicated TCI state groups and beam indication.

The indication of one or more TCI states may be used for one or more of the following. The indication of one or more TCI states may be used for one or more links (e.g., downlink, uplink, and/or sidelink). The indication of one or more TCI states may be used for one or more channels (e.g., control channel, shared channel, random access channel, broadcast channel, etc.) The indication of one or more TCI states may be used for one or more signals (e.g., CSI-RS, SRS, DM-RS, TRS, SSB, positioning RS (PRS), etc). The indication of one or more TCI states may be used for one or more cells (e.g., multiple serving cells and/or cells other than serving cells for inter-cell operation).

The modes of operation may be determined based on one or more of the following.

A mode of operation may be determined based on a configuration of confirmation resource. For example, if a WTRU is configured with (e.g., via configuration information) a confirmation resource, the WTRU may determine the first mode of operation (e.g., a beam application based on a base station confirmation, such as a gNB confirmation). If the WTRU is not configured with (e.g., via configuration information) the confirmation resource, the WTRU may determine the second mode of operation (e.g., a beam application based on a beam indication or a WTRU ACK/NACK).

A mode of operation may be determined based on a WTRU capability and/or base station confirmation (e.g., gNB configuration) based on a WTRU capability reporting.

A WTRU may request a preferred mode of operation for a base station confirmation (e.g., a gNB confirmation). For example, if the WTRU is capable of supporting multiple modes of operation (e.g., a first mode and a second mode) and measurements at the WTRU indicate a preferred mode of operation (e.g., similar measured quality trend for multiple links, channels, signals and/or cells), the WTRU may indicate to a base station (e.g., a gNB) for the preferred mode of operation. For example, if quality of channel (e.g., RSRP, RSRQ, SINR, etc.) between the WTRU and the base station (e.g., the gNB) is lower than or equal to a threshold, the WTRU may determine to use a first mode (e.g., a beam application based on a base station confirmation, such as a gNB confirmation). If quality of channel between the WTRU and the base station (e.g., gNB) is higher than the threshold, the WTRU may determine to use a second mode (e.g., a beam application based on a beam indication or a WTRU ACK/NACK). The threshold may be determined based on one or more of WTRU implementation, a predefined value, or a configured and/or indicated value by the base station (e.g., the gNB).

A mode of operation may be determined based on reliability (e.g., required reliability) of a link. A WTRU may be configured with (e.g., via configuration information) a first mode of operation and a second mode of operation. The second mode may be used for a normal mode of operation (e.g., scheduling based on DCI formats 1_1, 1_2, 0_1, 0_2, etc.). The first mode may be used as a fall-back mode of operation (e.g., scheduling based on DCI formats 1_0 and/or 0_0). The WTRU may apply one or more TCI states or one or more TCI state groups (e.g., indicated by a base station, such as a gNB). If scheduled channels and/or signals (e.g., newly scheduled channels and/or signals) are scheduled by DCI formats 1_0 and/or 0_0, the one or more TCI states or the one or more TCI state groups may be applied after X time duration (e.g., in terms of symbols, slots, or ms) from when (e.g., in terms of a slot or a symbol) the WTRU received a base station confirmation (e.g., a gNB confirmation). If the scheduled channels and/or signals (e.g., newly scheduled channels and/or signals) are scheduled by DCI formats 1_1, 1_2, 0_1, 0_2, etc, the WTRU may apply the one or more TCI states or the one or more TCI state groups after Y time duration (e.g., in terms of symbols, slots, or ms) from when (e.g., in terms of a slot or a symbol) the WTRU received a base station indication (e.g., a gNB indication) of the one or more TCI states or the one or more TCI state groups. If the scheduled channels and/or signals (e.g., the newly scheduled channels and/or signals) are scheduled by DCI formats 1_1, 1_2, 0_1, 0_2, etc, the WTRU may apply the one or more TCI states or the one or more TCI state groups after Y time duration (e.g., in terms of symbols, slots, or ms) from when (e.g., in terms of a slot or a symbol) the WTRU sent an ACK/NACK on the base station indication (e.g., the gNB indication).

A mode of operation may be determined based on a serving cell or TRP type. A WTRU may be configured with (e.g., via configuration information) a first mode of operation and a second mode of operation. The second mode may be used for a first cell or a first TRP type (e.g., one or more of Pcell, PScell, or a primary TRP). The first mode may be used for a second cell or a second TRP type (e.g., Scell or a secondary TRP). For example, one or more TCI states (e.g., indicated by a base station, such as a gNB) may be applied after X time duration (e.g., in terms of symbols, slots, or ms) from when (e.g., in terms of a slot or a symbol) the WTRU received a base station confirmation (e.g., a gNB confirmation), e.g., if scheduled channels and/or signals (e.g., newly scheduled channels and/or signals) are scheduled for the first cell or the first TRP (e.g., one or more of Pcell, PScell, a primary TRP). If the scheduled channels and/or signals (e.g., the newly scheduled channels and/or signals) are scheduled for the second cell or the second TRP, the WTRU may apply the one or more TCI states or the one or more TCI state groups, e.g., after Y time duration (e.g., in terms of symbols, slots, or ms) from when (e.g., in terms of a slot or a symbol) the WTRU received a base station indication (e.g., a gNB indication) of the one or more TCI states or the one or more TCI state groups, or from when (e.g., in terms of a slot or a symbol) the WTRU sent an ACK/NACK on the base station indication (e.g., the gNB indication). The first cell and the second cell may be determined based on a serving cell ID of a configured cell. For example, a serving cell ID (e.g., a specific serving cell ID, such as 0) may be used for the first cell, e.g., wherein other serving cell IDs may be used for the second cell. The primary TRP and the second TRP may be determined based on a CORESETPoolIndex of a ControlResourceSet. For example, a first CORESETPoolIndex (e.g., a specific CORESETPoolIndex, such as 0) may be used for the primary TRP, e.g., wherein a second CORESETPoolIndex may be used for the secondary TRP.

The WTRU may determine an application of an indicated beam, e.g., based on a base station confirmation (e.g., a gNB confirmation). For example, when the WTRU receives a beam indication (e.g., a new beam indication), the WTRU may transmit an ACK/NACK of the beam indication (e.g., the new beam indication), e.g., based on configured (e.g., RRC configured) and/or indicated (e.g., via a beam indication DCI) one or more resources (e.g., PUCCH resource(s)). For example, if the WTRU receives (e.g., successfully) the beam indication (e.g., the new beam indication), the WTRU may report an ACK in the resources. If the WTRU does not receive the beam indication (e.g., the new beam indication), the WTRU may report a NACK in the resources. After reporting an ACK/NACK based on the received (e.g., successfully received) beam indication (e.g., new beam indication), the WTRU may receive a confirmation of the ACK/NACK from the base station (e.g., the gNB). Based on the confirmation of the base station (e.g., the gNB), the WTRU may determine whether to apply the indicated beam (e.g., the newly indicated beam) or not. If the WTRU receives the confirmation of the ACK/NACK, the WTRU may apply the indication beam (e.g., the newly indicated beam), e.g., after X time duration (e.g., in terms of symbols, slots, or ms) from when (e.g., in terms of a slot or a symbol) the WTRU received the base station confirmation (e.g., the gNB confirmation). If the WTRU does not receive the confirmation of the ACK/NACK, the WTRU may support one or more of following methods (e.g., assuming the base station (e.g., the gNB) did not receive (e.g., successfully) the ACK/NACK. The WTRU may skip applying the indicated beam (e.g., the newly indicated beam). The WTRU may retransmit the ACK/NACK, e.g., after Z time duration (e.g., in terms of symbols, slots, or ms) from when (e.g., in terms of a slot or a symbol) the WTRU expected to receive the base station confirmation (e.g. the gNB confirmation). The retransmission of the ACK/NACK may be determined, e.g., based on a number of retransmission. For example, if the number of retransmission is lower than or equal to a threshold, the WTRU may determine to retransmit the ACK. If the number of retransmission is higher than the threshold, the WTRU may skip retransmitting the ACK/NACK. The threshold may be determined based on one or more of WTRU implementation, predefined value, or configured and/or indicated value by the base station (e.g., the gNB). The WTRU may expect to receive the base station confirmation (e.g., the gNB confirmation) in a next confirmation resource. The location of the next confirmation resource may be determined, e.g., based on a location of the missing gNB confirmation. For example, the WTRU may try to detect the confirmation, e.g., after K time duration (e.g., in terms of symbols, slots, or ms) from when (e.g., in terms of a slot or a symbol) the WTRU expected to receive the previous (e.g., the missing) base station confirmation (e.g., gNB confirmation).

The WTRU may receive a confirmation of the ACK/NACK from the base station (e.g, the gNB). The WTRU may determine an indication of the confirmation based on one or more of the following methods.

The WTRU may receive explicit indication(s). For example, the WTRU may receive one or more indications which indicate a confirmation of the ACK/NACK. The indication may be based on one or more of a DCI, a MAC CE, or a RRC. The indication may be based on an explicitly indicating base station confirmation (e.g., an explicitly indicating gNB confirmation). In examples, 0 may be an explicit indication of a base station confirmation for a NACK. 1 may be an explicit indication of a base station confirmation for an ACK. The indication may be based on toggling a field. In examples, 0 transitioning to 1 and 1 transitioning to 0 may be an indication of a base station confirmation for an ACK. 0 transitioning to 0 and 1 transitioning to 1 may be an indication of a base station confirmation for a NACK.

The WTRU may receive indication(s) based on RS transmission(s). The WTRU may receive one or more RS transmissions from a base station (e.g., a gNB). The RS may be one or more of SSB, CSI-RS, PRS, DM-RS, or PT-RS. One or more RS resources and/or RS resource sets may be used as one or more confirmation resources. For example, the WTRU may be configured and/or indicated (e.g., based on one or more of a RRC, a MAC CE, or a DCI) with one or more RS resources and/or RS resource set for the one or more RS transmissions. A configuration of the one or more RS resource and/or the one or more RS resource set may include one or more of following. The configuration may include physical cell ID, serving cell ID, and/or scrambling ID. The configuration may include RS downlink BWP, e.g., bwp-Id, for channel measurement. The RS downlink BWP for channel measurement may be based on an associated reference RS resource set.

The configuration may include a RS resource set list of references to CSI-IM resources used for beam management and reporting, e.g., csi-IM-ResourceSetList. The configuration may include a RS resource set id used in a corresponding RS report configuration to refer to a candidate CSI- RS resource set, e.g., csi-ResourceConfigId. The configuration may include a RS resource set list of references to SSB resources used for beam management and reporting, e.g., csi-SSB-ResourceSetList. The configuration may include a RS resource set list of references to NZP CSI-RS resources used for beam management and reporting, e.g., nzp-CSI-RS-ResourceSetList. The configuration may include RS time domain behavior of a candidate RS resource set configuration, e.g., resource Type. The configuration may include RS resources associated with the RS Resource set, e.g., nzp-CSI-RS-Resources. The configuration may include an indication to an application of a repetition, e.g., repetition. The configuration may include an indication to a mapping of the antenna ports for the RS resources within a corresponding RS resource set, e.g., trs-Info. The configuration may include an offset between the beam indication and the slot that the one or more transmissions was received, e.g., aperiodicTriggeringOffset.The offset may be a relative offset, e.g., based on the slot which the WTRU received the beam indication. If the WTRU received the beam indication in slot N and the configured relative offset is M slots, the WTRU may receive the one or more RS transmissions in slot N+M.

The WTRU may receive indication(s) based on PDCCH transmission(s). The WTRU may receive one or more PDCCH transmissions from a base station (e.g., a gNB). In this case, one or more CORESETs and/or search spaces may be used as one or more confirmation resources. For example, the WTRU may be configured and/or indicated (e.g., based on one or more of a RRC, a MAC CE, or a DCI) with one or more CORESETs and/or search spaces for the one or more PDCCH transmissions. The configuration of the one or more CORESETs and/or the one or more search spaces may include one or more of the following. The configuration may include a REG bundle size. The configuration may include a CORESET duration. The configuration may include a CORESET mapping type (e.g., interleaved or non-interleaved). The configuration may include precoder granularity. The configuration may include a resource blocks (RB) offset. The configuration may include a PDCCH demodulation reference signal (DMRS) scrambling ID. The configuration may include a CORESET ID. The configuration may include a search space ID. The configuration may include a monitoring slot periodicity and an offset. The offset may be a relative offset, e.g., based on a slot which the WTRU received the beam indication. For example, if the WTRU received the beam indication in slot N and the configured relative offset is M slots, the WTRU may receive the one or more PDCCH transmissions in slot N+M. The configuration may include a search space duration. The configuration may include monitoring symbols within a slot. The configuration may include a number of candidates. The configuration may include DCI format(s) to be monitored. The configuration may include an aggregation level. The configuration may include an RNTI. The WTRU may be configured with (e.g., via configuration information) more than one RNTI for a same mode of operation. The WTRU may determine a base station confirmation (e.g., a gNB confirmation), e.g., if it detects a switch from one RNTI to another.

The WTRU may receive indication(s) based on receiving configuration(s) of downlink or uplink resource(s) (e.g., new configuration of downlink or uplink resource(s)) or change in configuration(s) of downlink or uplink resource(s). The WTRU may determine a base station confirmation (e.g., a gNB confirmation), e.g., by receiving configuration(s) of downlink or uplink resource(s) (e.g., new configuration of downlink or uplink resource(s)) or change in configuration(s) of downlink or uplink resource(s). The downlink or uplink resource(s) may be DMRS(es), SRS resource(s), PUCCH resource(s), RACH resource(s), etc. For example, the WTRU may determine the base station confirmation (e.g., the gNB confirmation) by detecting a change in size of PUCCH resource set.

The WTRU may determine a base station confirmation (e.g., a gNB confirmation) based on one or more of the following. The determination of the base station confirmation may be based on whether the base station (e.g., the gNB) transmitted a confirmation (e.g., a RS transmission or PDCCH transmission, or detecting a new configuration or a change in a configuration of a downlink or an uplink resource) or not. For example, the WTRU may identify the base station confirmation (e.g., the gNB confirmation) if the base station (e.g., the gNB) transmits a confirmation. If the WTRU detects transmission(s) of one or more RSs and/or one or more PDCCHs in configured confirmation resource(s), the WTRU may determine to apply the indicated beam (e.g., the newly indicated beam). If the WRU does not receive the one or more RSs and/or the one or more PDCCH transmissions, the WTRU may assume that the base station (e.g., the gNB) did not receive an ACK/NACK of the WTRU.

The determination of a base station confirmation may be based on one or more parameters of a received base station confirmation (e.g., a received gNB confirmation). For example, the WTRU may identify the base station confirmation (e.g., the gNB confirmation) based on one or more parameters of the received base station confirmation (e.g., gNB confirmation). If the WTRU receives the base station confirmation (e.g., the gNB confirmation) with a first set of parameters (e.g., a first scrambling ID), the WTRU may determine to apply the indicated beam (e.g., the newly indicated beam). If the WTRU receives the base station confirmation (e.g., the gNB confirmation) with a second set of parameters (e.g., a second scrambling ID), the WTRU may assume that the base station (e.g., the gNB) did not receive an ACK/NACK of the WTRU. The parameters to determine the base station confirmation (e.g., the gNB confirmation) may be one or more of the following. The parameter may be a RS resource or resource set (e.g., a first RS resource or a second RS resource). The parameter may be a scrambling ID (e.g., a first scrambling ID or a second scrambling ID). The parameter may be a RNTI for a PDCCH transmission (e.g., a first RNTI or a second RNTI). The parameter may be a periodicity and/or offset (e.g., a first periodicity and/or offset or a second periodicity and/or offset). The parameter may be a number of antenna ports for a RS transmission. The parameter may be a DCI format (e.g., a first format or a second format). The parameter may be a CORESET ID and/or a search space ID. The parameter may be a CORESET duration and/or a search space duration. The parameter may be an aggregation level. The parameter may be a PDCCH DMRS scrambling ID. The parameter may be precoder granularity. The parameter may be a REG bundle size.

Different confirmation methods may be used based on a WTRU-reported ACK/NACK. If the WTRU reports an ACK, a confirmation may be based on one or more RS transmissions. If the WTRU reports a NACK, a confirmation may be based on one or more PDCCH transmissions.

Figure 11:
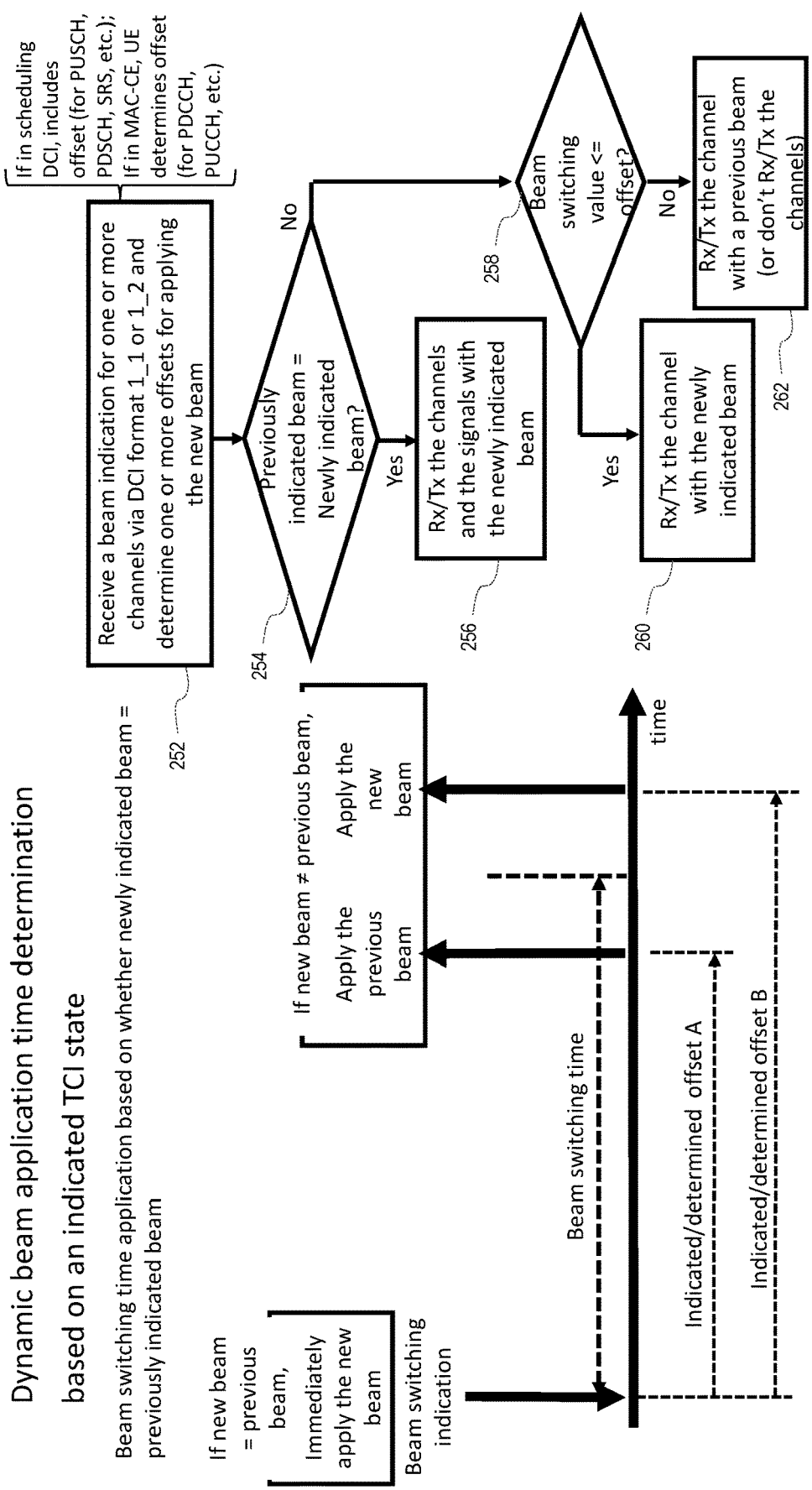
FIG. 11 illustrates dynamic beam application time determination based on an indicated TCI state.

FIG. 11 illustrates dynamic beam application time determination based on an indicated TCI state. At 252, a WTRU may receive a beam indication for one or more channels, e.g., via DCI format 1_1 or 1_2. The WTRU may determine one or more offsets for applying the newly indicated beam. At 254, the WTRU may determine if a previously indicated beam is the same as the newly indicated beam. If a previously indicated beam is the same as the newly indicated beam, at 256, the WTRU may send and/or receive channel transmission(s) and signal(s) using the newly indicated beam. If a previously indicated beam (e.g., the most recent previously indicated beam) is different from the newly indicated beam, at 258, the WTRU may determine if a beam switching time value is less than or equal to an indicated/determined offset. If the beam switching time value is less than or equal to the indicated/determined offset, at 260, the WTRU may send and/or receive channel transmission(s) and signal(s) with the newly indicated beam. If the beam switching time value is great than the indicated/determined offset, at 262, the WTRU may send and/or receive channel transmission(s) and signal(s) with the previously indicated beam (or may not send and/or receive channel transmission(s)).

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed:

1. A wireless transmit-receive unit (WTRU), comprising:
a processor configured to:
receive configuration information that indicates a first transmission configuration indicator (TCI) state group and a second TCI state group, wherein the first TCI state group comprises at least a first TCI state and a third TCI state and the second TCI state group comprises at least a second TCI state, and wherein the first TCI state is associated with a first downlink reference signal, the second TCI state is associated with a second downlink reference signal, and the third TCI state is associated with a third downlink reference signal;
measure a first downlink power value and a first power reduction value that are associated with the first downlink reference signal;
measure a second downlink power value and a second power reduction value that are associated with the second downlink reference signal;
measure a third downlink power value and a third power reduction value that are associated with the third downlink reference signal;
report the first downlink power value, the first power reduction value, the second downlink power value, and the second power reduction value;
report the third downlink power value and the third power reduction value;
receive, via a downlink transmission, an indication to use the first TCI state group for an uplink transmission, wherein the downlink transmission comprises scheduling information for the uplink transmission;
determine the first TCI state from the first TCI state group based at least on the first downlink power value and the first power reduction value, wherein the processor being configured to determine the first TCI state from the first TCI state group based at least on the first downlink power value and the first power reduction value comprises the processor being further configured to:
compare the first downlink power value and first power reduction value with the third downlink power value and third power reduction value in response to receiving the indication of the first TCI state group, and
determine the first TCI state from the first TCI group based on a comparison of the first downlink power value and first power reduction value with the third downlink power value and the third power reduction value; and
send the uplink transmission based on the first TCI state.

2. The WTRU of claim 1, wherein the processor being configured to determine the first TCI state from the first TCI group based on the comparison of the first downlink power value and first power reduction value with the third downlink power value and the third power reduction value comprises the processor being further configured to:
  adjust the first downlink power value based on the first power reduction value and the third downlink power value based on the third power reduction value; and
  determine the first TCI state from the first TCI group based on the adjusted first downlink power value being greater than the adjusted third downlink power value.

3. The WTRU of claim 1, wherein the first downlink power value is a downlink reference signal received power (RSRP) value, and wherein the first power reduction value is a power-management maximum power reduction (PMPR) value.

4. The WTRU of claim 1, wherein the downlink transmission is a downlink control information (DCI) transmission, and wherein the uplink transmission is a physical uplink shared channel (PUSCH) transmission.

5. A method implemented in a wireless transmit-receive unit (WTRU), comprising:
  receiving configuration information that indicates a first transmission configuration indicator (TCI) state group and a second TCI state group, wherein the first TCI state group comprises at least a first TCI state and a third TCI state and the second TCI state group comprises at least a second TCI state, and wherein the first TCI state is associated with a first downlink reference signal, the second TCI state is associated with a second downlink reference signal, and the third TCI state is associated with a third downlink reference signal;
  measuring a first downlink power value and a first power reduction value that are associated with the first downlink reference signal;
  measuring a second downlink power value and a second power reduction value that are associated with the second downlink reference signal;
  measuring a third downlink power value and a third power reduction value that are associated with the third downlink reference signal;
  reporting the first downlink power value, the first power reduction value, the second downlink power value, and the second power reduction value;
  reporting the third downlink power value and the third power reduction value;
  receiving, via a downlink transmission, an indication to use the first TCI state group for an uplink transmission, wherein the downlink transmission comprises scheduling information for the uplink transmission;
  determining the first TCI state from the first TCI state group based at least on the first downlink power value and the first power reduction value, wherein determining the first TCI state from the first TCI state group based at least on the first downlink power value and the first power reduction value further comprises:
    comparing the first downlink power value and first power reduction value with the third downlink power value and third power reduction value in response to receiving the indication of the first TCI state group, and
    determining the first TCI state from the first TCI group based on a comparison of the first downlink power value and first power reduction value with the third downlink power value and the third power reduction value; and
  sending the uplink transmission based on the first TCI state.

6. The method of claim 5, wherein the method determining the first TCI state from the first TCI group based on the comparison of the first downlink power value and first power reduction value with the third downlink power value and the third power reduction value further comprises:
  adjusting the first downlink power value based on the first power reduction value and the third downlink power value based on the third power reduction value; and
  determining the first TCI state from the first TCI group based on the adjusted first downlink power value being greater than the adjusted third downlink power value.

7. The method of claim 5, wherein the first downlink power value is a downlink reference signal received power (RSRP) value, and wherein the first power reduction value is a power-management maximum power reduction (PMPR) value.

8. The method of claim 5, wherein the downlink transmission is a downlink control information (DCI) transmission, and wherein the uplink transmission is a physical uplink shared channel (PUSCH) transmission.

9. A wireless transmit/receive unit (WTRU), comprising:
  a processor configured to:
    receive configuration information, wherein the configuration information indicates a first control resource set (CORESET) and a second CORESET;
    receive information, via a medium access control (MAC) control element (CE), that indicates a first set of transmission configuration index (TCI) states and a second set of TCI states, wherein each of the first and second sets of TCI states comprises a respective first TCI state and a respective second TCI state;
    receive downlink control information (DCI) that indicates one of: the first set of TCI states or the second set of TCI states; and
    receive physical downlink control channel (PDCCH) signaling using one of the first CORESET or the second CORESET and one of the TCI states in the set of TCI states indicated in the DCI.

10. The WTRU of claim 9, wherein, based on a condition that the DCI indicates the first set of TCI states, the processor being configured to receive the PDCCH signaling comprises the processor being configured to receive the PDCCH signaling using the first CORESET and at least one of the TCI states in the first set of TCI states.

11. The WTRU of claim 9, wherein, based on a condition that the DCI indicates the second set of TCI states, the processor being configured to receive the PDCCH signaling comprises the processor being configured to receive the PDCCH signaling using the second CORESET and at least one of the TCI states in the second set of TCI states.

12. The WTRU of claim 9, wherein the first CORESET is associated with a first TCI state group and the second CORESET is associated with a second TCI state group.

13. The WTRU of claim 9, wherein the first set of TCI states is associated with a first TCI state group and the second set of TCI states is associated with a second TCI state group.

* * * * *